(12) United States Patent
Rabii

(10) Patent No.: US 9,489,067 B2
(45) Date of Patent: Nov. 8, 2016

(54) SCALABLE TOUCHSCREEN PROCESSING WITH REALTIME ROLE NEGOTIATION AMONG ASYMMETRIC PROCESSING CORES

(75) Inventor: Khosro M. Rabii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 13/588,908

(22) Filed: Aug. 17, 2012

(65) Prior Publication Data

US 2014/0049480 A1 Feb. 20, 2014

(51) Int. Cl.
*G06F 3/041* (2006.01)
*G06F 1/32* (2006.01)
*G06F 9/50* (2006.01)

(52) U.S. Cl.
CPC ............. *G06F 3/041* (2013.01); *G06F 1/3262* (2013.01); *G06F 1/3293* (2013.01); *G06F 3/0416* (2013.01); *G06F 3/0418* (2013.01); *G06F 9/5005* (2013.01); *G06F 2209/509* (2013.01); *Y02B 60/121* (2013.01); *Y02B 60/142* (2013.01)

(58) Field of Classification Search
CPC .. G06F 3/0488; G06F 3/04883; G06F 3/044; G06F 3/04886; G06F 3/045
See application file for complete search history.

(56) References Cited

U.S. PATENT DOCUMENTS

| 8,125,456 | B2 | 2/2012 | Krah et al. | |
|---|---|---|---|---|
| 2007/0198981 | A1* | 8/2007 | Jacobs et al. | 718/102 |
| 2008/0184042 | A1 | 7/2008 | Parks et al. | |
| 2010/0225618 | A1* | 9/2010 | Yamashita et al. | 345/175 |
| 2010/0277429 | A1 | 11/2010 | Day et al. | |
| 2011/0061947 | A1 | 3/2011 | Krah et al. | |
| 2011/0080367 | A1 | 4/2011 | Marchand et al. | |
| 2011/0300901 | A1 | 12/2011 | Shen et al. | |
| 2012/0062474 | A1 | 3/2012 | Weishaupt et al. | |
| 2012/0120024 | A1* | 5/2012 | Lin et al. | 345/175 |
| 2012/0191993 | A1* | 7/2012 | Drader | G06F 1/3215 713/320 |
| 2012/0287074 | A1 | 11/2012 | Westerman | |
| 2013/0016042 | A1* | 1/2013 | Makinen et al. | 345/168 |
| 2013/0067259 | A1* | 3/2013 | Freiwald | G06F 1/3293 713/323 |
| 2013/0135218 | A1* | 5/2013 | Jain et al. | 345/173 |
| 2013/0176273 | A1* | 7/2013 | Li et al. | 345/174 |
| 2013/0314331 | A1* | 11/2013 | Rydenhag | G06F 3/04883 345/173 |
| 2013/0332892 | A1* | 12/2013 | Matsuki | 715/863 |

FOREIGN PATENT DOCUMENTS

JP 2001202192 A1 7/2001
WO 02054198 A2 7/2002

OTHER PUBLICATIONS

International Search Report and Written Opinion—PCT/US2013/047615—ISA/EPO—Jan. 9, 2013.

\* cited by examiner

*Primary Examiner* — Lixi C Simpson
*Assistant Examiner* — Ngan T Pham Lu
(74) *Attorney, Agent, or Firm* — Nicholas A. Cole

(57) ABSTRACT

A method for determining touch input data complexity and negotiating the processing of touch inputs from a touchscreen controller to a host processor. As touch input data is received from a touchscreen, the data may be evaluated by the touchscreen controller to determine the data's complexity. When the touchscreen controller determines the received touch input data is too complex for touchscreen controller processing, the host processor may be requested to process the data. The touchscreen controller may resume processing touch input data based on low complexity or host processor availability. Complexity may be determined based on evaluations of the number and frequency of touch inputs. Additionally, the touch input data may be evaluated to determine whether it represents multi-touch input. In an aspect, the touchscreen controller may disregard received touch input data determined to be noise.

44 Claims, 9 Drawing Sheets

SCALABLE TOUCHSCREEN PROCESSING WITH REALTIME ROLE NEGOTIATION AMONG ASYMMETRIC PROCESSING CORES

BACKGROUND

Modern computing devices, such as mobile smart phones and tablets, may utilize touchscreen capabilities to gather and process user touch input data. These touch-sensitive devices may contain hundreds of touch sensors (or nodes) managed by a touchscreen controller which processes detected touch input, executing related commands based on the input. The power required to process touch input data may be proportional to the size of the touchscreen (i.e., panel size), as larger touchscreens may have larger touch node capacities. As the size and fidelity of touchscreens on computing devices increases and the corresponding user input applied to these devices becomes more complex (e.g., implementing multi-finger touch gestures), the touchscreen controller may become inadequate to satisfactorily process such data. For example, the touchscreen controller may not be able to keep up with many and rapid user touches on the screen, such as dual hand multi-touch on a soft-QWERTY keyboard, leading to missed user inputs and degraded performance, both of which will impact the user experience. Although such computing devices also contain other processors, particularly the host or core processor, which are capable of processing more resource-intensive actions, such processors typically have high ambient power requirements and may not be efficient for touch input data processing.

SUMMARY

The various aspects provide systems, devices and methods for processing touch input data from a touchscreen by selectively employing a touchscreen controller or a host processor depending on the complexity of the touch screen inputs. An aspect method may include determining a complexity of a touch input data received from the touchscreen, processing the touch input data with the touchscreen controller when the determined complexity is within a predefined tolerance threshold, and processing the touch input data with the host processor and placing the touchscreen controller in a low-power state when the determined complexity exceeds the predefined tolerance threshold. An aspect method may further include returning processing of the touch input data to the touchscreen controller from the host processor when the determined complexity of the touch input data falls below the predefined tolerance threshold. In an aspect, determining the complexity of received touch input data may include evaluating a histogram of touch input data previously received and processed by the touchscreen computing device, in which the touch input data is assigned a high complexity value when the histogram indicates rapid changes in the volume of touch input data over a period of time and/or when the histogram represents a uniform distribution of touch input data over a period of time. In an aspect, determining the complexity of received touch input data comprises analyzing one or more of: a region of the touchscreen represented in the touch input data; characteristics of the touch input data; memory accesses; an idle state of the touchscreen controller; rapidity of touches represented in the touch input data; touch kinetics; and estimations of quality of service over time. In an aspect, the predefined tolerance threshold is defined so that processing touch input data with a complexity below the predefined tolerance threshold by the touchscreen controller will produce acceptable user experiences. An aspect method may further include determining whether the received touch input data is noise based on analysis of the received touch input data, and disregarding the received touch input data when the touch input data is determined to be noise, in which noise includes data that represents ambient noise, near-touch noise, false-touch noise, and/or static-touch noise. An aspect method may further include placing the touchscreen controller in a low-power state when no touch input data is received, and placing the touchscreen controller in the low-power state when touch input data is processed by the host processor.

An aspect method may further include determining whether the host processor is available to process the received touch input data in response to determining that the complexity of the received touch input data exceeds the predefined tolerance threshold. In such an aspect, processing the touch input data with the host processor and placing the touchscreen controller in a low-power state when the determined complexity exceeds the predefined tolerance threshold may include processing the touch input data with the host processor and placing the touchscreen controller in a low-power state when the determined complexity exceeds the predefined tolerance threshold and the host processor is determined to be available. In such an aspect, determining whether the host processor is available may be based on evaluations of at least one of the host processor's workload, available battery power, a sleep state of the host processor, the complexity of the touch input data, and an assessment of whether the touch input data is noise. An aspect method may further include configuring the touchscreen computing device to utilize at least one of increased quantization, increased filtering, and a reduced scan rate in response to determining that the host processor is unavailable to process received touch input data. In an aspect, determining whether the host processor is available to process the received touch input data may include transmitting by the touchscreen controller a request to the host processor to take over active processing of the touch input data when the determined complexity exceeds the predefined tolerance threshold, determining that the host processor is available in response to receiving an acceptance response from the host processor, and determining that the host processor is not available in response to receiving a rejection response from the host processor.

In an aspect, a touchscreen equipped electronic device may include a touchscreen display, a touchscreen controller and a host processor coupled to the touchscreen display and touchscreen controller, in which the touchscreen controller and host processor are configured to perform operations of the aspect methods described above. In another aspect, a touchscreen equipped computing device may include means for performing functions of the aspect methods described above. In a further aspect, a non-transitory processor-readable storage medium may have stored on it processor-executable instructions configured to cause a touchscreen controller and host processor to perform operations of the aspect methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
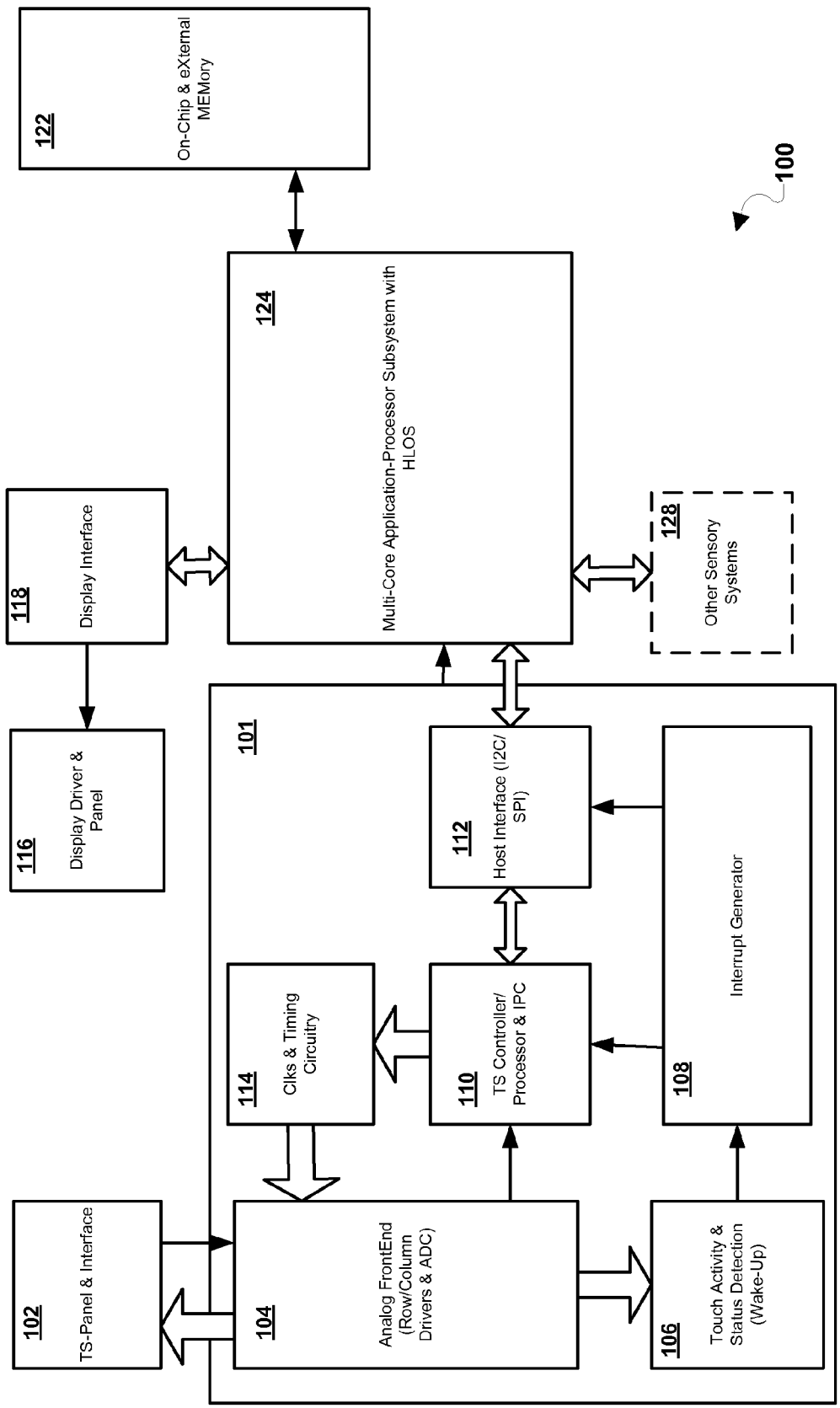
FIG. 1 is a component block diagram of a touchscreen device suitable for use with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "mobile device" is used herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, and similar personal electronic devices which include a programmable processor, memory, a touchscreen display and touchscreen controller circuitry.

Touchscreen displays are becoming one of the most common forms of user interfaces for computing devices, especially mobile devices. Touchscreen displays are configured detect a user's touch (such as by a finger tip or a special pointer tip) on the display, and generate signals which may be processed by a touchscreen controller to recognize the location on the display of the touch. The touch location information is then processed by user interface software as a user input to the mobile device. For ease of reference, user touches on a touchscreen display are referred to herein as "touch inputs," the signals generated by a touchscreen display in response to a user's touch are referred to herein as "touchscreen touch inputs," and the information contained within touchscreen touch inputs (i.e., the raw data generated by the touchscreen circuits) is referred to herein as "touch input data."

The various aspects include methods to enable a touchscreen-equipped computing device to selectively use either an efficient but limited touchscreen controller ("TSC" in the drawings) or a host processor with increased resources to process touch input data received from a touchscreen display in response to a user's touch. The process of transferring the processing of touch input data between the touchscreen controller and the host processor may be referred to as "role negotiation." When touch input data is of a complexity that may overwhelm the processing capability of the touchscreen controller (i.e., the touch input data is too complex for the touchscreen controller), role negotiation may occur to shift processing of touch input data to the host processor (or a core within a multicore host processor) until the complexity of the touch input data diminishes to the point that the touchscreen controller can process the data. By shifting the processing of touch input data to the host processor, complex touchscreen touch inputs (e.g., multi-finger movement gestures) may be handled without a negative performance impact or degraded user experience. Since, the frequency and duration of complex touchscreen touch inputs is typically low as users may rarely engage in complex multi-touch operations on touchscreen computing devices, the impact on battery life of temporarily shifting the processing of complex touch input data to the host processor is expected be minor and not impact the user experience.

In general, as a touchscreen computing device receives touch inputs from a user (e.g., finger taps, swipes, stylus interactions, and multi-touch pinches), the touchscreen controller may evaluate the touch input data to determine a complexity of the input. The input complexity may depend upon the number, area and/or rapidity of touches. For example, the touchscreen controller may determine that a single tap input from the user is of nominal complexity, and that fast multi-touch tapping (e.g., typing or finger painting) are of high complexity or has a high complexity value. The touchscreen controller may compare the determined complexity level or complexity value to a tolerance threshold that reflects the processing capabilities and/or conditions of the touchscreen controller. A touch input complexity value determined to be within the tolerance threshold may be processed by the touchscreen controller in the typical manner, as the touchscreen controller will likely be able to process the touch input data and maintain an acceptable user experience. However, if the determined complexity value exceeds the acceptable tolerance threshold (i.e., the touch input data is too complex for the touchscreen controller), the processing of the touch input data may be shifted to the host processor, which has significantly more computing power, and thus is able to handle processing of the complex touch input data.

Complexity determinations of touch input data may be based on many factors, including previously detected (and processed) touch input data. In an aspect, the touchscreen controller may review charts or histograms describing touch input data received and/or processed over a period of time (e.g., the preceding 300 milliseconds). The touchscreen controller may analyze trends in the received touch input data to evaluate the typicality of current touch input data. In cases in which a dramatic change in the characteristics, amount, or quality of touch input data is detected, the touchscreen controller may recognize that the currently received touch input data exhibits high complexity. In another aspect, the touchscreen controller may evaluate the idle time percentages of the touchscreen controller to determine the complexity of touch input data, similar to how dynamic clock voltage scaling (DCVS) algorithms function. In other aspects, touch input data complexity determinations may be based on the amount of local memory accesses recorded within a period of time, the number of detected touch inputs compared to a normalized profile, touch input characteristics (e.g., touch-device type, use, size, accuracy, linearity, etc.), touch kinetics (e.g., direction, speed, and 3D-touch processing, etc.), and estimations of quality of service over time (e.g., resolution, response time, etc.). In an aspect, the touchscreen controller, a component associated with the touchscreen controller, and/or the host processor may perform operations to determine the touch input data complexity.

In an aspect, when the detected complexity of touch input data exceeds a predefined complexity tolerance threshold, the touchscreen controller may signal for the host processor to begin accepting and processing the touch input data. If the host processor happens to be in a low-power state, the touchscreen controller may also signal for the host processor to emerge from a low-power state (or sleep state). Once in an active state (or awake state), the host processor may process the touch input data while the touchscreen controller transitions to an efficient, low-power sleep state to conserve battery power. If the host processor ceases to receive touch input data within a defined sample period (which may indicate that the user input has ended or paused), or if the host processor determines that the complexity of received touch input data has fallen below a complexity threshold such that the touchscreen controller can handle the workload, the host processor may pass the processing of touch input data back to the touchscreen controller.

In an aspect, upon receiving a request from the touchscreen controller to process received touch input data, the host processor may independently determine the level of complexity of the touch input data and/or the operating state of the host processor (e.g., current workload). When the host processor determines the touch input data is appropriate for processing on the host processor (e.g., the host processor is available and the touch input data is too complex for processing by the touchscreen controller), the host processor may transmit an acceptance signal to the touchscreen controller. Additionally, the host processor may reject the touchscreen controller's requests (e.g., send rejection signals) for the host processor to process complex touch input data. For example, the host processor may be overburdened with higher priority computations. When the host processor is not available (e.g., the host processor has not fully emerged from a sleep state, the touchscreen computing device's battery has little remaining power, etc.), the touchscreen controller may continue to process the complex touch input data. However, the touchscreen controller may process the complex touch input data less accurately and/or more slowly as the complex touch input data exceeds the processing capabilities of the touchscreen controller. In an aspect, the touchscreen controller may be configured to continue processing complex touch input data that has been degraded or simplified. For example, when touch input data is determined to be too complex for the touchscreen controller and the host processor is unavailable, the touchscreen controller may increase parameters used by quantifiers which may simplify the touch input data by decreasing the data's fidelity. The touchscreen computing device may scale complex touch input data using quantizers, horizontal and vertical integrators to generate reduced resolution or quality-of-service touch input data while the host processor is unavailable and/or until the host processor is ready to process the complex touch input data.

In an aspect, the touchscreen controller may also analyze touch input data to assess whether the touch input data indicates noise or unintentional touch inputs, which are conditions that should be ignored by both the touchscreen controller and the host processor. Noise (or noise touch input data) may be erratic information that does not represent valid touch input data but instead is superfluous or useless data. For example, the touchscreen controller may determine that several rapid tap touch inputs are noise and thus do not correspond to a valid user touch input. As another example, if a user places his whole hand on the touchscreen, the touchscreen controller may recognize that as a false positive. The touchscreen controller's distinction between noise and valid touch input data may prevent the unnecessary use of the host processor and thus may prevent unnecessary power consumption.

FIG. 1 is a component block diagram of a touchscreen computing device 100 suitable for use with the various aspects. A touchscreen computing device 100 may be any computing device that is connected to or contains a touchscreen panel 102 or otherwise receives touch inputs for processing. For example, touchscreen computing devices 100 may include smartphones, tablet devices, gaming devices (e.g., Nintendo DS, Nintendo 3DS, Sony Vita, etc.), etc. As another example, a smart-TV having a connected touchscreen peripheral device may also be a touchscreen computing device 100. The touchscreen panel 102 may be an interface for receiving user touch inputs based on detected tactile (or near tactile) interactions. For example, a user may use fingers, stylus, or other physical implements to touch and thereby provide the touchscreen panel 102 with a touch input. Touchscreen panels 102 and interfaces may include touch sensors and may be implemented to utilize various touch-sensing techniques, such as resistive, surface capacitive, projected capacitive, infrared, surface-acoustic-wave, strain gauge, optical imaging, dispersive-signal-technology, etc. For example, a resistive touchscreen panel 102 may detect touch inputs based upon detecting a physical depression on a surface caused by a user's finger on the touchscreen panel 102.

The touchscreen computing device 100 may include a touchscreen controller subsystem 101 that includes circuits configured to receive and process touchscreen touch inputs, included touch input data, from the touchscreen panel 102. For example, the touchscreen controller subsystem 101 may include an analog front end circuit 104 that may receive analog signals corresponding to detected touch inputs on the touchscreen panel 102, and may utilize row and column drivers and/or other components, such as multiplexors, to categorize, combine, and/or otherwise turn the received signals into processable data.

In response to receiving touchscreen touch inputs, the analog front end circuit 104 may transmit received touchscreen touch inputs to a touch activity detection component 106 that may be configured to determine whether the touchscreen panel 102 has encountered touch inputs (e.g., whether there is touchscreen panel 102 activity). In an aspect, the touch activity detection component 106 may determine activity based on evaluating and differentiating temporal averages of reported touchscreen touch inputs. For example, stored information received over a period of time may be evaluated to determine whether received touchscreen touch inputs describe activity or are errata. The touch activity detection component 106 may also communicate with an interrupt generator 108 that may transmit interrupt signals to the touchscreen controller 110. For example, when a touch input is detected on the touchscreen panel 102 while the touchscreen controller 110 is configured to be in a sleep state or mode, the interrupt generator 108 may send interrupt signals indicating that the touchscreen controller 110 should wake or that there is touch input data available for processing. In an aspect, the interrupt generator 108 may produce signals received by a host processor 124.

The analog front end circuit 104 may additionally deliver touchscreen touch inputs to the touchscreen controller 110. In an aspect, the analog front end circuit 104 may alternatively deliver other signals that represent the touch input data related to touch inputs detected on the touchscreen panel 102. For example, the analog front end circuit 104 may process received touchscreen touch inputs and transmit a data signal containing touch input data to the touchscreen controller 110 in general the touchscreen controller 110 is a processing unit that processes touch input data and provides user input commands or data to the device processor in a form that can be processed by the operating system and/or applications as user inputs. As discussed above, the touchscreen controller 110 may also determine whether touch input data represents valid information requiring processing (e.g., valid touch input data as opposed to noise). For example, the touchscreen controller 110 may evaluate touchscreen touch inputs to determine whether included touch input data represents useless noise. The touchscreen controller 110 may utilize a clock or timing circuitry 114 and may transmit commands to the analog front end circuit 104 based on information maintained by the clock or timing circuitry 114.

The touchscreen controller subsystem 101 may also include a host interface 112 that enables the touchscreen controller 110 to transmit user input data (e.g., the location on the touchscreen of a user touch) to the host processor 124. The host interface 112 may utilize system component communication protocols, such as an inter-integrated circuit (I2C) protocol and/or a serial peripheral interface (SPI) protocol. Additionally but not shown, the touchscreen controller subsystem 101 may include a quantizer component, a horizontal integrator component, and a vertical integrator component which may be controlled by the touchscreen controller 110 and may scale touchscreen touch input and/or touch input data to various resolutions. For example, touchscreen touch inputs may be scaled down in resolution to increase the efficiency at which the touchscreen controller 110 may process related touch input data. Also not shown, the touchscreen controller subsystem 101 may further include components for tracking and/or holding touchscreen touch inputs (i.e., binning control) that may spatially integrate touchscreen touch inputs and enable the touchscreen computing device 100 to reduce scan rates related to detecting touch inputs.

The host processor 124 may be a multi-core host processor that may be distinct from the touchscreen controller 110. The host processor 124 may be any of a variety of programmable processors capable of running applications and an operating system for managing such applications. For example, the host processor 124 may persistently execute a high level operating system (HLOS) that may perform numerous routines to utilize the components and software of the touchscreen computing device 100. The host processor 124 may also store data within and retrieve data from a memory component 122 that may be external and/or on-chip memory.

The touchscreen computing device 100 may further include a display panel 116 (and associated drivers) configured to render various imagery. For example, the display panel 116 may be an LCD display capable of displaying a graphical user interface (GUI) for an application being executed on the host processor 124. The host processor 124 may control the display panel 116 by transmitting data via a display interface 118 component which may translate or process data for rendering by the display panel 116.

the host processor 124 may receive data from the touchscreen controller 110 capable of being utilized by the various applications executed on the host processor 124. In an aspect, the host processor 124 may configured to receive touchscreen touch inputs and/or touch input data directly from the touchscreen subsystem 101 to enable the processor to process touch input data. For example, the touchscreen computing device 100 may include a data path that directs raw touchscreen touch inputs to the host processor 124. In an optional aspect, the host processor 124 be coupled to other sensors 128, such as accelerometers.

the touchscreen computing device 100 may also include other components not shown in FIG. 1, such as application data movers for transferring various data from the host processor 124, a graphic processing unit (GPU) that process and generate data related to multimedia, and display-processors and/or controllers that may communicate display commands from the host processor 124 to the display interface 118.

Figure 2:
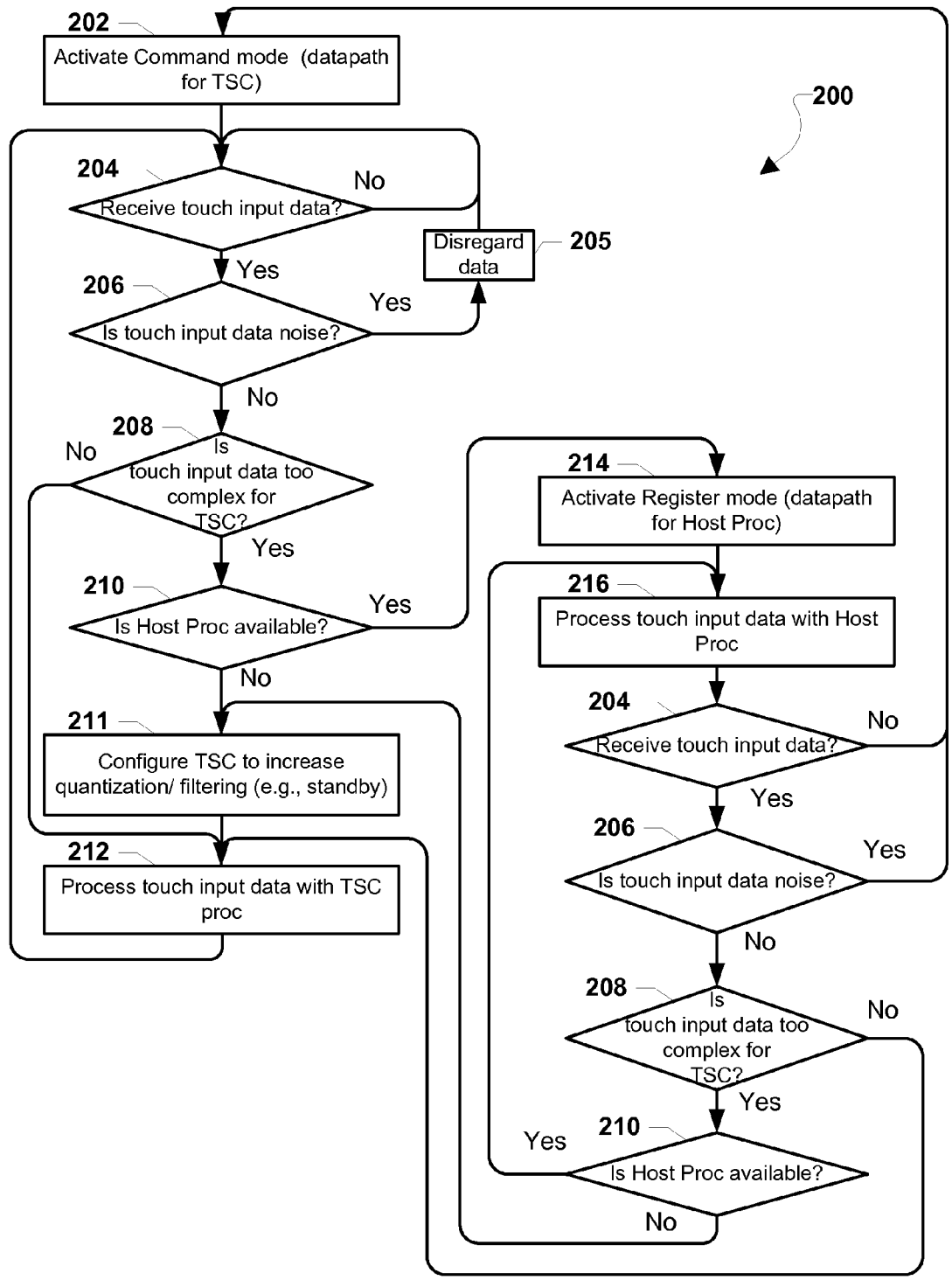
FIG. 2 is a process flow diagram illustrating an aspect method for a touchscreen computing device processing touch input data.

FIG. 2 is a process flow diagram illustrating an aspect method for a touchscreen computing device processing touch input data. As described above, the touchscreen computing device may include at least a touchscreen controller, having relatively low computational abilities with low power consumption requirements, and a host processor, having relatively high computational abilities with high power consumption requirements. By default, the touchscreen controller may process touch input data from touchscreen touch inputs delivered by the touchscreen panel, and may transmit processed data to the host processor for use by the operating system and application software executing on the host processor. In an aspect, To leverage the greater computing ability of the host processor, the touchscreen controller stop processing touch input data having a complexity exceeding a tolerance threshold, and the host processor may take over processing of the complex touch input data. In doing so, the touchscreen computing device may implement an unsupervised real-time streaming interface in which touch input data may circumvent the touchscreen controller by being transmitted in a data path to the host processor and its associated components, such as on-chip memory.

In block 202, the touchscreen computing device may activate or be configured to operate in a "command" configuration mode (i.e., command mode). An activated command mode may indicate that the touchscreen controller is configured to process touch input data within touchscreen touch inputs received in response to detected touch inputs on the touchscreen panel. For example, when configured to operate in command mode, the touchscreen computing device may utilize a data path that includes transmitting signals (e.g., touchscreen touch inputs) from a touchscreen panel to an analog front end circuit, to a data binning component, to quantizer and integrator components, and finally to the touchscreen controller for further processing. In an aspect, the activated command mode may be indicated with a flag, a system variable, or any other indicator the touchscreen computing device may utilize to represent its current configuration for handling received touch input data.

In determination block 204, the touchscreen controller may determine whether touch input data has been received. In other words, the touchscreen controller may determine whether touchscreen touch inputs containing touch input data are available for processing by the touchscreen controller. For example, the touchscreen controller may receive an interrupt signal indicating that touch inputs have been detected on the touchscreen panel. As another example, the touchscreen controller may receive an interrupt signal indicating that touchscreen touch inputs are available from an analog front end circuit. In an aspect, the touchscreen controller may periodically monitor for receipt of touchscreen touch inputs in a buffer (e.g., check for incoming signals once every millisecond). If no touch input data is received (i.e., determination block 204="No"), the touchscreen controller may continue to evaluate whether touch input data is received in determination block 204.

If touch input data is received (i.e., determination block 204="Yes"), in determination block 206 the touchscreen controller may assessed whether the received touch input data is noise. In general, noise may be information received by touch sensors at the touchscreen panel that does not represent valid user touch inputs. For example, noise may be errant or useless information reported by touch sensors. Noise data is described in more detail below with reference to FIG. 3. If the assessment of the touch input data is that it is likely noise (i.e., determination block 206="Yes"), in block 205 the touchscreen controller may disregard the touch input data and continue with the operations in determination block 204. In various aspects within the specification, the operations in block 205 to disregard touch input data may be performed by the touchscreen controller or host processor when touch input data is determined to be noise.

If the touchscreen controller determines that the touch input data is not noise (i.e., determination block 206="No"), in determination block 208 the touchscreen controller may determine whether the touch input data is too complex for the touchscreen controller to process further. As described above, overly complex touch input data may exceed the computational abilities of the touchscreen controller and therefore may produce an unsatisfactory user experience. Complexity determination operations are described below with reference to FIGS. 4 and 5. If the touchscreen controller determines that the touch input data is not too complex for processing by the touchscreen controller (i.e., determination block 208="No"), in block 212 the touchscreen controller may process the touch input data and continue with the operations in determination block 204. For example, the touchscreen controller may receive touch input data describing a single finger touch input on the touchscreen panel and may evaluate the touch input data to determine a software command associated with the single finger touch input.

However, if the touchscreen controller determines that the touch input data is too complex for processing by the touchscreen controller (i.e., determination block 208="Yes"), in determination block 210 the touchscreen controller may determine whether the host processor is available to process the touch input data. For example, the host processor may not be available if the touchscreen computing device battery has low service power. The operations for determining whether the host processor is available are described below with reference to FIG. 6.

In an aspect, the touchscreen controller may transmit a request (or invitation) for the host processor to assume control over the processing of the touch input data. In response, the host processor may determine its availability (e.g., workload, battery level, etc.) and may accept or reject the request via response signals. In another aspect, such signals from the host processor may indicate a future time at which the host processor may be available. For example, the host processor may transmit a signal that indicates it is currently in the process of becoming available (e.g., waking from low-power sleep state or finishing a task) and that the host processor may be available to process touch input data at a specified future time.

If the touchscreen controller determines that the host processor is not available (i.e., determination block 210="No"), in block 211 the touchscreen controller, and the various components within the touchscreen controller subsystem as described above, may process reduced-resolution touchscreen touch inputs and/or touch input data that is within the processing capability of the touchscreen controller. To maintain an acceptable performance, the touchscreen controller may receive and process reduced-resolution touchscreen touch inputs and/or touch input data that has been binned, filtered and/or quantized, therefore making the touch input data less complex but less accurate. For example, touch input data determined to be too complex for the touchscreen controller may be scaled down, averaged, decreased in precision, or minimized to be in a less accurate state or have a lower quality of server (QoS). With such reduced resolution, the touch input data may be more manageable for the touchscreen controller to process, but as a result, the touchscreen controller may generate suboptimal data for subsequent use by applications or other software running on the host processor. For example, an application may receive from the touchscreen controller less accurate, less reliable, erroneous, or only a portion of the total touch inputs as provided by the user on the touchscreen panel. In block 212, the touchscreen controller may process the touch input data and continue with the operations in determination block 204.

In an aspect, when the touchscreen controller continues to process touch input data determined to be too complex (i.e., of a high complexity or has a high complexity value), the touchscreen controller may be considered to be in a standby state until the host processor can assume the processing of the complex touch input data. In other words, the standby state touchscreen controller may continue to process complex touch input data until the host processor wakes or otherwise becomes available. For example, the touchscreen controller may be in a standby state processing reduced-resolution touch input data after requesting the host processor to process touch input data. When the host processor becomes available, the touchscreen controller may cease to be in the standby state, and touch input data may not be reduced resolution or otherwise degraded.

If the touchscreen controller determines that the host processor is available (i.e., determination block 210="Yes"), in block 214 the touchscreen computing device may activate a "register" configuration mode (i.e., register mode). Similar to the above described command mode, the register mode may signal the host processor that it is to process received touch input data. In an aspect, when configured to operate in the register mode, the touchscreen computing device may utilize a data path that enables the host processor to directly receive touchscreen touch inputs (included touch input data) for processing without participation by the touchscreen controller. For example, when configured to operate in register mode, the touchscreen computing device may route touch input data resulting from touchscreen touch inputs from the touchscreen panel to an analog frontend, to a data binning component, to quantizer and integrator components, to spatial, column, and row windowing components controlled by the host processor, and finally to a touch input data mover component controlled by the host processor. In block 216, the host processor may process the touch input data, and may utilize the processed data in combination with other applications executing on the host processor. For example, the host processor may intermittently perform operations to execute an application (e.g., an email client with GUI) and process touch input data relating to the application.

In determination block 204, the touchscreen controller may determine whether additional touch input data is received while the touchscreen computing device is configured to operate in register mode. In an alternative aspect, when the register mode is activated, interrupt signals indicating that a touchscreen touch input is present may be transmitted to the host processor, which in turn may determine whether touch input data has been received. If no additional touch input data is received while the touchscreen computing device is configured to operate in register mode (i.e., determination block 204="No"), the touchscreen computing device may be configured to be in command mode in block 202. In other words, if no touch input data is received for a predefined period once the register mode is activated, indicating that the volume of touch input data is within the capability of the touchscreen controller, the command mode may be activated and processing of subsequent touch input data may be returned to the touchscreen controller. This ensures that the host processor is not occupied standing by to process touch input data when no such data is forthcoming. Thus, when the user stops touching the touchscreen display for a predetermined time, the operation of the device returns to a normal mode in which the touchscreen controller processes touch input data. In another aspect, the command mode may be activated immediately after any touch input data has been processed by the host processor, thereby immediately enabling the touchscreen controller to process subsequently received touch input data.

However, if additional touch input data is received while the touchscreen computing device is configured to operate in register mode (i.e., determination block 204="Yes"), in determination block 206 the touchscreen controller may determine whether the touch input data is noise and, if not noise (i.e., determination block 206="No"), in determination block 208 the touchscreen controller may determine whether the touch input data is too complex for the touchscreen controller. If the touchscreen controller determines that the touch input data is noise (i.e., determination block 206="Yes"), the touchscreen computing device may be configured to operate in command mode in block 202 and the touchscreen controller may process subsequently received touch input data.

If the touchscreen controller determines that the touch input data received while the touchscreen computing device is configured to operate in register mode is not too complex for the touchscreen controller to process (i.e., determination block 208="No"), in block 212 the touchscreen controller may process the touch input data and may continue with the operations in block 202. If the touchscreen controller determines that the touch input data received while the touchscreen computing device is configured to operate in register mode is too complex for the touchscreen controller (i.e., determination block 208="Yes"), in determination block 210 the touchscreen controller may determine whether the host processor is available for processing the touch input data. If the host processor is available (i.e., determination block 210="Yes"), the host processor may perform the operations in block 216 and continue the operational loop. If the touchscreen controller determines that the host processor is not available (i.e., determination block 210="No"), in block 211 the touchscreen controller may configure the touchscreen computing device (e.g., the touchscreen controller) to reduce the resolution of touch input data and in block 212 the touchscreen controller may process the touch input data.

In an aspect, when the touchscreen computing device is configured to operate in register mode, the host processor may buffer touch input data for processing. For example, when the host processor is overburdened with other operations for applications (i.e., determination block 210="Yes"), touch input data may not be directed to the touchscreen controller for processing, but instead may be temporarily stored and processed by the host processor when it becomes available.

In an aspect, the operations in determination blocks 206, 208, and 210 may be performed by the host processor while the touchscreen computing device is configured to be in register mode. For example, the host processor may determine whether touch input data continues to be too complex for the touchscreen controller when register mode is activated. In this aspect, the touchscreen controller can be placed in a low power (sleep) mode while the device is in the register mode, thereby conserving battery power.

In an aspect, the host processor may perform any combination (or none) of the operations in determination blocks 206, 208, and 210. For example, once the touchscreen computing device is configured to operate in register mode, the host processor may continue to process all received touch input data (e.g., complex or not complex) until the received touch input data is determined to be noise by the host processor. As another example, once the touchscreen computing device is configured to operate in register mode, the host processor may indiscriminately process any touch input data that is received by the touchscreen computing device. In other words, the host processor may process all touch input data (e.g., complex and not complex touch input data) that is received within a predefined period of activating register mode.

Figure 3:
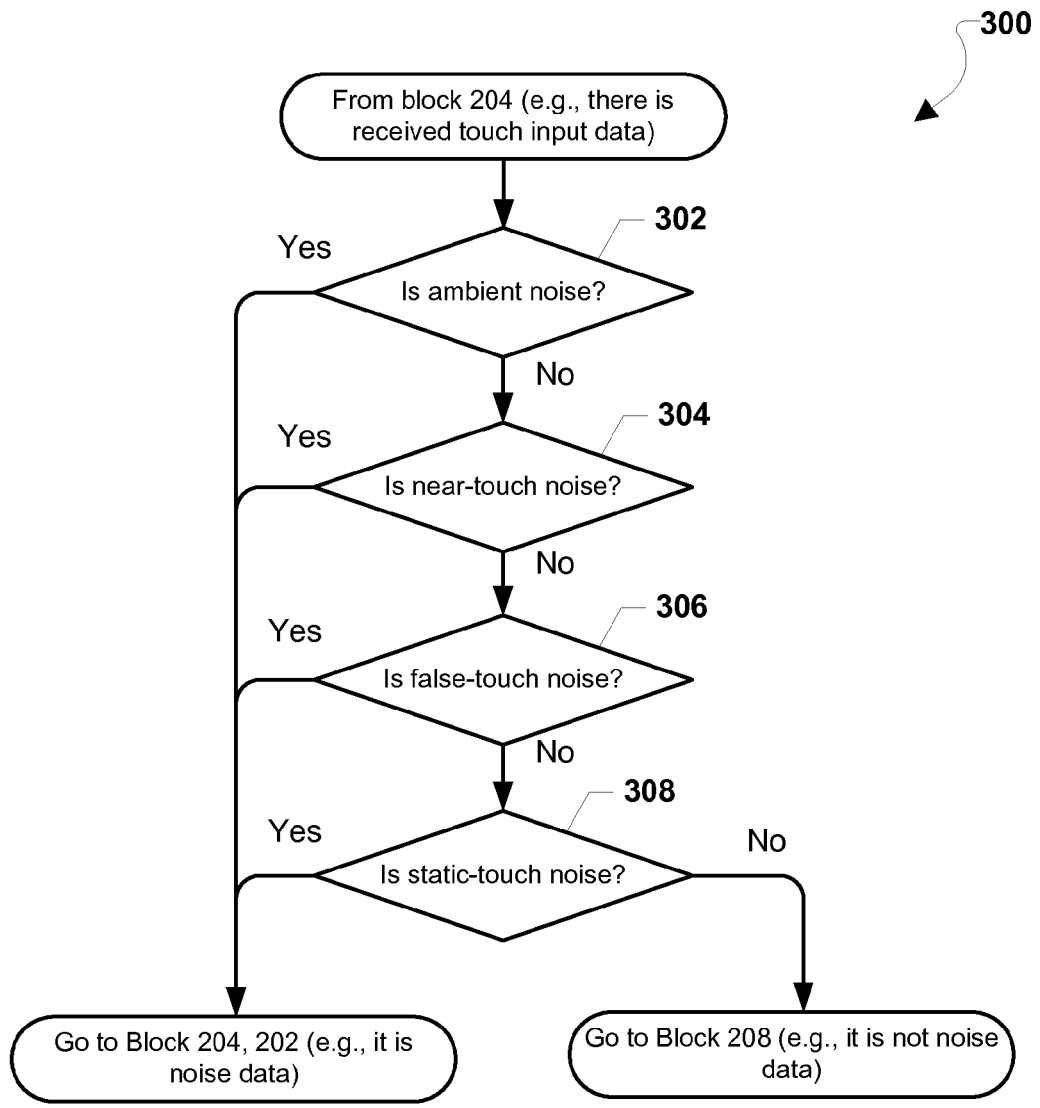
FIG. 3 is a process flow diagram illustrating an aspect method for a touchscreen computing device detecting noise data.

FIG. 3 illustrates an aspect method 300 for determining whether touch input data is noise. As described above, noise (or noise data) may be information detected and reported by touchscreen panel touch sensors that is errata, invalid, or otherwise not useful to applications being executed by a host processor. Noise may alternatively be characterized as false positive data that is similar to information useable by applications, but that is unintended by the user, generated by electrical noise and/or otherwise errant. The touchscreen controller may perform the operations of the method 300 or employ a processor or circuit configured to evaluate touch input data to determine whether it is noise. For example, the touchscreen controller subsystem may include a noise analysis component. Determining whether touch input data is noise may be important in conserving power and improved performance. For example, when touch input data is determined to be noise, the touchscreen controller may ignore the data and not perform operations to determine touch input data complexity and avoid needlessly engaging the power-hungry host processor. In an aspect, when the touchscreen computing device is configured to operate in register mode, the host processor may execute routines or operations to perform the method 300.

In various aspects, the touchscreen controller may perform the method 300 upon receiving touch input data (e.g., FIG. 2, determination block 204="Yes") and in place of the operations in determination block 206 of FIG. 2. For example, the touchscreen controller may perform the operations of the method 300 each time the user provides touch input (e.g., taps) on the touchscreen panel. In determination block 302, the touchscreen controller may determine whether the touch input data is ambient noise. Ambient noise may be information reported by touchscreen panel touch sensors that does not correspond to an actual touch input performed by the user. In an aspect, ambient noise may be reported by touchscreen panel touch sensors based on poor grounding of the user or particulates within the atmosphere. For example, touch sensors of a projected capacitive touchscreen computing device may report noise due to moisture particles (e.g., capacitants) in the air around the touchscreen panel. The touchscreen controller may determine whether the touch input data is ambient noise based on similarities between the touch input data and predetermined data patterns (e.g., constant, low levels of wide-spanning touch input data may be regarded as ambient noise), evaluations of the touch input data's strength (e.g., the input data may represented by faint signals), and other touch input data characteristics that indicate randomness and/or the lack of actual human interaction with the touchscreen panel (e.g., the touch input data does not correspond to valid touch inputs). If the touchscreen controller determines that the touch input data is ambient noise (i.e., determination block 302="Yes"), the touchscreen controller may disregard the touch input data and continue with the operations in determination block 204 or block 202 of FIG. 2.

If the touchscreen controller determines that the touch input data is not ambient noise (i.e., determination block 302="No"), in determination block 304 the touchscreen controller may determine whether the touch input data is near-touch noise, which may be characterized as touch input data generated due to unintended touch inputs by the user or overly-sensitive touch sensor reporting. For example, near-touch noise may be generated and presented to the touchscreen controller when the user taps numerous times on the touchscreen panel at a very fast speed (or within a small period). In an aspect, the touchscreen controller may determine near-touch noise by identifying multiple touch inputs at coincident positions on the touchscreen panel that all occur within a period of time that exceeds a predefined tolerance threshold. For example, several user taps at a particular location on the touchscreen panel within a second may exceed a tolerance threshold and therefore be recognized as near-touch noise. If the touchscreen controller determines that the touch input data is near-touch noise (i.e., determination block 304="Yes"), the touchscreen controller may disregard the touch input data and continue with the operations in determination block 204 or block 202 of FIG. 2.

If the touchscreen controller determines that the touch input data is not near-touch noise (i.e., determination block 304="No"), in determination block 306 the touchscreen controller may determine whether the touch input data represents false-touch noise. In general, false-touch noise may describe touch inputs on the touchscreen panel that were not likely intended to correspond to user input for an application executing on the touchscreen computing device. For example, when the user pulls a tablet touchscreen computing device out of a bag, he/she may place all of his/her hand on the touchscreen panel, causing a false touch. In an aspect, the touchscreen controller may recognize false-touch noise by comparing the touch input data to normalized touch input data over time. For example, the touchscreen controller may compare the region of the touchscreen panel involved in the current touch input data to the typical (or normalized) surface area related to previous touch input data. When the touch input data does not match (or is not within a tolerance threshold of similarity) to previous valid touch input data, the touchscreen controller determines that the touch input data is false-touch noise. If the touchscreen controller determines that the touch input data is false-touch noise (i.e., determination block 306="Yes"), the touchscreen controller may disregard the touch input data and continue with the operations in determination block 204 or block 202 of FIG. 2.

If the touchscreen controller determines that the touch input data is not false-touch noise (i.e., determination block 306="No"), in determination block 308 the touchscreen controller may determine whether the touch input data is static-touch noise, which may correspond to a prolonged or static user touch input on the touchscreen panel. For example, static-touch noise may occur when the user picks-up his/her touchscreen computing device (e.g., a smartphone) and the user's finger remains in contact with a single location of the touchscreen panel for a period of time. The touchscreen controller may recognize static-touch noise by evaluating the duration that touch input data remains unchanged. In an aspect, if touch input data represents a touch input at a constant location in excess of a predefined period, the touchscreen controller may disregard the touch input data corresponding to the location as static-touch noise. If the touchscreen controller determines that the touch input data is static-touch noise (i.e., determination block 308="Yes"), the touchscreen controller may disregard the touch input data and continue with the operations in determination block 204 or block 202 of FIG. 2. However, if the touchscreen controller determines that the touch input data is not static-touch noise (i.e., determination block 308="No"), the touchscreen controller may determine that the touch input data is valid touch input data and may continue with the operations in determination block 208 described above with reference to FIG. 2.

In an aspect, the touchscreen controller may utilize various stored data patterns of known noise data. For example, the touchscreen controller may compare the touch input data to information within a database of known noise data patterns, and if there is a match, the touch input data may be disregarded as noise.

Figure 4:
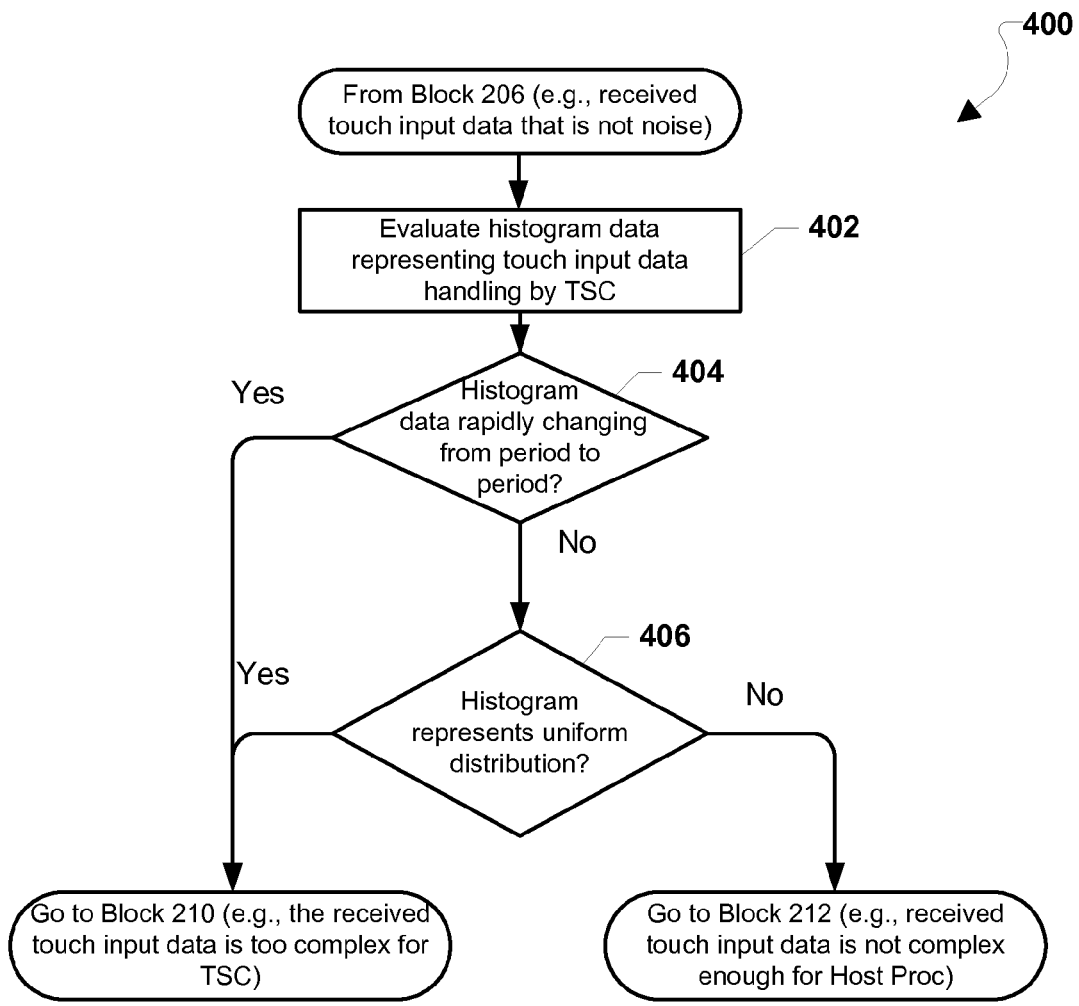
FIG. 4 is a process flow diagram illustrating an aspect method for a touchscreen computing device evaluating histogram data to determine whether touch input data is too complex for a touchscreen controller to process.

FIG. 4 illustrates an aspect method 400 for a touchscreen computing device evaluating histogram data to determine whether to utilize a host processor for processing touch input data. As described above, the role negotiation between a touchscreen controller and the host processor may be based on whether touch input data is too complex for the touchscreen controller to process and maintain acceptable performance. The touchscreen controller may estimate the complexity of touch input data by reviewing previously processed touch input data, and when the previously processed touch input data is determined to be dynamic over a certain period (e.g., previously processed touch input data changes dramatically), the touchscreen controller may determine that recently received touch input data is complex and thus requires the processing abilities of the host processor.

To estimate the complexity of received touch input data, the touchscreen controller may review stored touch input data histogram information that may describe trends or anomalies related to previously processed touch input data. Histograms may include information regarding previously processed touch input data received during a certain period (e.g., every few milliseconds) and may include sets of information describing previously processed touch input data tracked over many previous periods. Histogram information may additionally be used to compute various statistical information, such as the average, normalized, or typical touch input data encountered during the execution of particular applications, during certain segments of time, etc. Further, histogram information may describe frequencies of previously processed touch input data related to locations on the touchscreen panel (e.g., number of touch inputs in various locations on the touchscreen panel over a period).

The method 400 may be performed by the touchscreen controller or by the host processor when the touchscreen computing device is operating in the register mode. Additionally, to avoid unnecessary power consumption and/or time expense, the complexity evaluations of the method 400 may be performed when received touch input data is determined to not be noise, such as described above with reference to the operations in FIG. 3.

In block 402, the touchscreen controller may evaluate histogram information representing touch input data previously processed within a certain period. For example, based on the type of application being executed or the current operating conditions of the touchscreen computing device (e.g., battery power, number of concurrently running applications, etc.), the touchscreen controller may evaluate histogram information characterizing touch input data received for a long or short time period. In an aspect, the touchscreen controller may evaluate histogram information characterizing touch input data corresponding to particular locations of the touchscreen panel. For example, evaluated histogram information may describe the number of touch inputs on a particular touchscreen panel quadrant for a certain period. For example, determining the complexity of received touch input data may include evaluating a histogram of touch input data previously received and processed by the touchscreen computing device, and assigning a high complexity value to the touch input data when the histogram indicates rapid changes in the volume of touch input data over a period of time and/or when the histogram represents a uniform distribution of touch input data over a period of time. In various aspects, the touchscreen controller may include assessments of various factors when evaluating histogram information and determining the complexity of the received touch input data, including the technology of the touch sensors and/or touchscreen panel (e.g., resistive, capacitive, etc.), the resolution of the touchscreen panel (e.g., rows and columns density of the touch sensors within the panel), and whether the received touch input data is to be used in combination with data from other sources (e.g., cooperative sensory systems, such as accelerometers).

In determination block 404, the touchscreen controller may determine whether previously processed touch input data changes dramatically or rapidly between periods of time within the evaluated histogram information. For example, the touchscreen controller may compare the number of detected touch inputs from a first time period to the number of touch inputs detected in a second time period occurring immediately after the first time period. In an aspect, the touchscreen controller may compare the touch input activity within numerous consecutive time periods to extrapolate trending information. For example, by evaluating a first, second, and third time period, the touchscreen controller may determine that the number of touch inputs substantially increased over time. By comparing various time periods of histogram information, the touchscreen controller may assess whether the received touch input data may represent or be related to an unsustainable trend of activity for the touchscreen controller.

The touchscreen controller may assess the changes in previously processed touch input data activity over the various time periods and utilize predefined tolerance thresholds to determine whether the changes indicate activity too complex for the touchscreen controller to adequately process. If the touchscreen controller determines that the changes indicate complex activity (i.e., determination block 404="Yes"), the touchscreen controller may continue with the operations in determination block 210 in which role negotiation operations may be performed to utilize the host processor.

However, if the touchscreen controller determines that the changes do not indicate complex activity (i.e., determination block 404="No"), in determination block 406 the touchscreen controller may determine whether the histogram information describes a uniform distribution over time of previously processed touch input data. In general, the touchscreen controller may process touch input data with acceptable performance when the touch input data is limited in scope. For example, if touch input data is related to touch inputs on a small region of the touchscreen panel (i.e., the touchscreen is relatively static), the touch input data may not be too complex for the touchscreen controller to process. However, when touch input data represents touch inputs distributed over a large region or set of regions on the touchscreen panel (i.e., there is a high amount of touchscreen perturbation), the touchscreen controller may be unable to adequately process the touch input data. So, if the touchscreen controller determines that the evaluated histogram information indicates a uniform distribution of previously processed touch input data (i.e., determination block 406="Yes"), the touchscreen controller may continue with the operations in determination block 210 in which role negotiation may be executed to utilize the host processor. If the touchscreen controller determines that the histogram information describes statically distributed previously processed touch input data (i.e., determination block 406="No"), the touchscreen controller may continue with the operations in block 212 in which the touchscreen controller may process the received touch input data.

Figure 5:
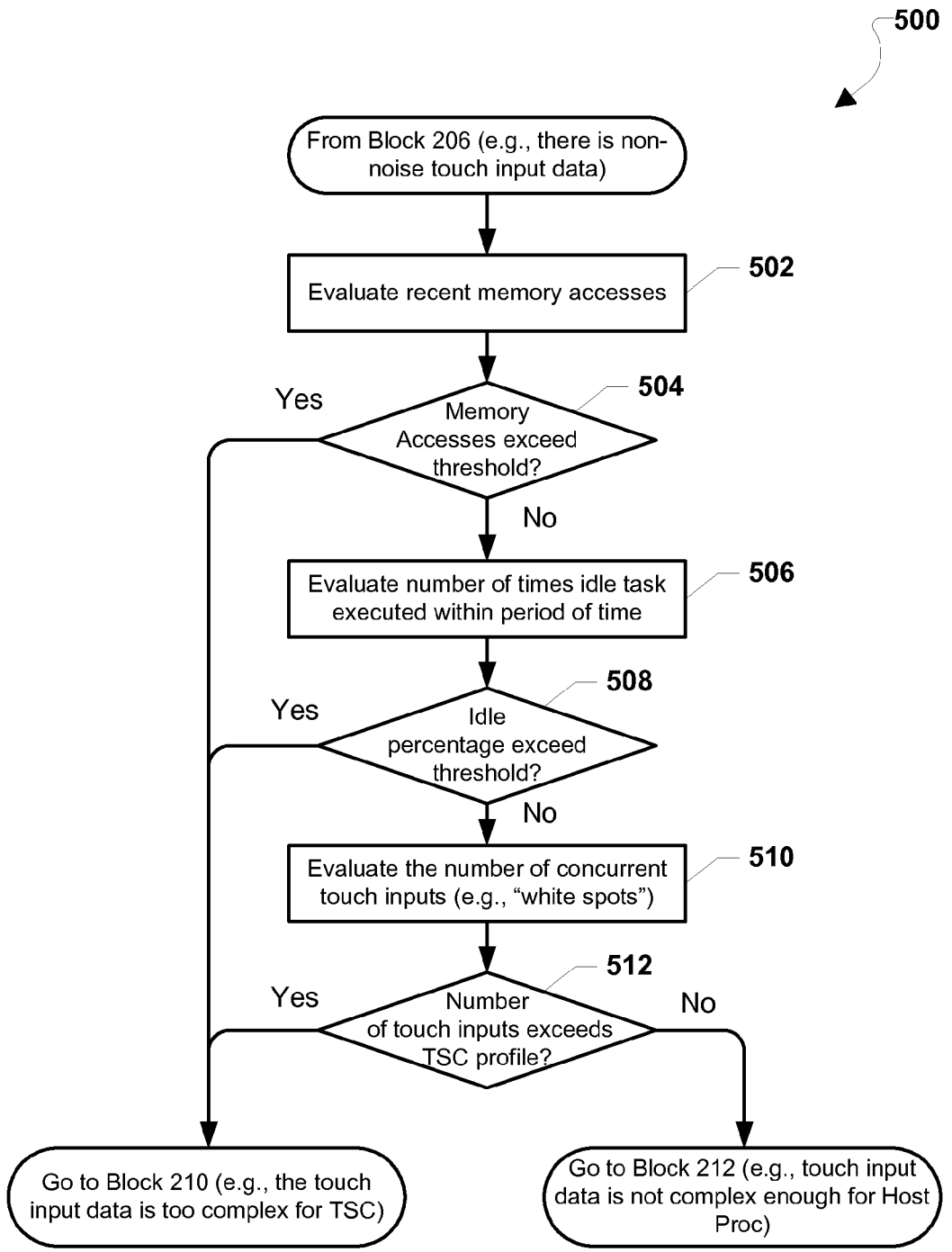
FIG. 5 is a process flow diagram illustrating an aspect method for a touchscreen computing device evaluating touch input data to determine complexity.

FIG. 5 illustrates another aspect method 500 for a touchscreen computing device evaluating touch input data to determine complexity. Similar to method 400 described above with reference to FIG. 4, the touchscreen controller may perform the operations of the method 500 to determine the complexity of received touch input data. In an aspect, the operations of method 500 may be performed separately or alternatively within the evaluations of the method 400 described above, as histogram information may be utilized in both. In other words, the operations of the method 500 may represent particular assessments performed when evaluating histogram information as described above with reference to FIG. 4. Additionally, the method 500 may be performed by the touchscreen controller, or by the host processor when the touchscreen computing device is in the register mode. Similar to as in FIG. 4, the touchscreen controller may perform the operations of the method 500 when the received touch input data is determined to not be noise, as determined in the operations in determination block 206 with reference to FIG. 2 and/or the operations described above with reference to FIG. 3.

In block 502, the touchscreen controller may evaluate recent memory accesses within a predefined period. Memory accesses may include actions by the touchscreen controller, or alternatively the host processor, to store data within or retrieve data from on-chip memory in response to receiving touch input data. Performing memory accesses related to processing touch input data may involve additional operations by the touchscreen controller (or the host process), which may reduce touchscreen controller performance and therefore may indicate that touch input data related to the memory accesses is more complex. When evaluating memory accesses to determine complexity, the touchscreen controller may evaluate stored histogram information that describes the number and/or extent of memory accesses the touchscreen controller has initiated over previous time periods. In an aspect, the touchscreen controller may also evaluate the computational expense of various memory accesses over a certain period. For example, the touchscreen controller may determine how memory accesses increase or decrease the computational efficiency of the touchscreen controller for a given period.

In an aspect, the touchscreen controller may access stored information on the touchscreen computing device that describes memory access information relating to previously processed touch input data. For example, the stored information may be a data table containing records for previously processed touch input data and corresponding memory access information related to the processing of the previously processed touch input data. The touchscreen processor may compare the received touch input data to previously processed touch input data. For example, if the received touch input data has characteristics (e.g., represent a similar number of touch inputs, represent touch inputs on similar locations on the touchscreen panel, etc.) similar to a previously processed touch input data, then the touchscreen controller may determine that they may match. If there is a match, the touchscreen processor may determine that the received touch input data may require similar memory accesses as the matched previously processed touch input data, and accordingly may use this match information when determining the complexity of the received touch input data.

In determination block 504, the touchscreen controller may compare the number and/or costs of recent memory accesses related to previously processed touch input data to a tolerance threshold to determine whether the received touch input data is too complex for the touchscreen controller. For example, if the touchscreen controller determines that the number of memory accesses exceeds a predefined number for a particular period, the received touch input data may be determined to be too complex for processing by the touchscreen controller. If the touchscreen controller determines that the accesses exceed the tolerance threshold (i.e., determination block 504="Yes"), the received touch input data may be determined to be too complex for processing by the touchscreen controller, and the touchscreen controller may continue with the operations in determination block 210, in which role negotiation may be performed to utilize the host processor.

If the touchscreen controller determines that the recent memory accesses do not exceed the tolerance threshold (i.e., determination block 504="No"), in block 506 the touchscreen controller may evaluate the idle percentage of the touchscreen controller for a period. In general, when the touchscreen controller (or any processor unit) does not have any routines or tasks to execute, the touchscreen controller may schedule an idle task for execution. For example, without any active tasks to be executed on the touchscreen controller, a scheduler routine may instruct the touchscreen controller to execute the idle task. In an aspect, the idle task may be referred to as process ID 0. The touchscreen controller may determine the idle percentage as the fraction of time the touchscreen controller executed the idle task over a period of time (e.g., idle time/measurement time). In an aspect, the touchscreen computing device may utilize an idle percentage determination algorithm similar to techniques used in dynamic clock voltage scaling (DCVS) algorithms, dynamic frequency scaling, etc. In an aspect, the touchscreen controller may review histogram information that describes recent changes in the idle state of the touchscreen controller regarding the processing of touch input data. For example, the touchscreen controller may compare the percentage of touchscreen controller idle time for several millisecond periods prior to receiving the received touch input data. In determination block 508, the touchscreen controller may determine whether the recent idle percentage exceeds a tolerance threshold. If the touchscreen controller determines that the idle percentage exceeds the tolerance threshold (i.e., determination block 508 "Yes"), the received touch input data may be determined too complex for processing by the touchscreen controller and the touchscreen controller may continue with the operations in determination block 210.

If the touchscreen controller determines that the idle percentage does not exceed the threshold for complexity (i.e., determination block 508="No"), in block 510 the touchscreen controller may evaluate concurrent touch inputs represented within the received touch input data. Touch input data may include information describing "white spots" which may indicate touch inputs on different regions or areas of the touchscreen panel. For example, for every finger pressed against the touchscreen panel in a time period, there may be a white spot representation in the received touch input data. The touchscreen controller may evaluate the received touch input data to detect simultaneous or concurrent touch inputs, which may be indicators of multi-touch activity.

In general, multi-touch activity may be more complex than single or staggered touch inputs. For example, a single touch to interact with a GUI element may be less complex than multi-touch typing on a soft QWERTY keyboard. Additionally, the number of touchscreen panel regions represented in the received touch input data may indicate the complexity of the received touch input data, as more complex touch inputs (e.g., multi-touch) may involve greater numbers of utilized regions on the touchscreen panel. For example, several multi-finger wipe, drag, or tap touch inputs may involve large sections of the touchscreen panel and thus may indicate complex touch input data.

In determination block 512, the touchscreen controller may determine whether the number of concurrent touch inputs represented in the received touch input data exceeds a tolerance threshold. In an aspect, the touchscreen controller may compare the white spots within received touch input data to stored, baseline information to determine whether the received touch input data involves a higher number of concurrent touch inputs. In an aspect, the baseline information may include concurrent touch inputs represented within predefined model touch input data or, alternatively, within previously processed touch input data for a certain period.

If the touchscreen controller determines that the received touch input data indicates a number of concurrent touch inputs that exceeds the tolerance threshold (i.e., determination block="Yes"), the touchscreen controller may continue with the operations in determination block 210. If the touchscreen controller determines that the received touch input data does not exceed the tolerance threshold (i.e., determination block 512="No"), the received touch input data may not be too complex for the touchscreen processor to process and so the touchscreen controller may continue with the operations in block 212.

In an aspect, the touchscreen controller may combine the various evaluations to generate an overall or composite complexity evaluation. For example, the touchscreen controller may attribute a complexity value for each of the memory accesses evaluation, the idle percentages evaluation, and the number of concurrent touch inputs evaluation. The touchscreen controller may compare the composite complexity evaluation to a tolerance threshold to determine whether the received touch input data is too complex for processing by the touchscreen controller.

In an aspect, the touchscreen controller may determine whether the host processor is available to process the received touch input data by transmitting a request to the host processor to take over active processing of the touch input data when the determined complexity exceeds the predefined tolerance threshold, determining that the host processor is available in response to receiving an acceptance response from the host processor, and determining that the host processor is not available in response to receiving a rejection response from the host processor.

Figure 6:
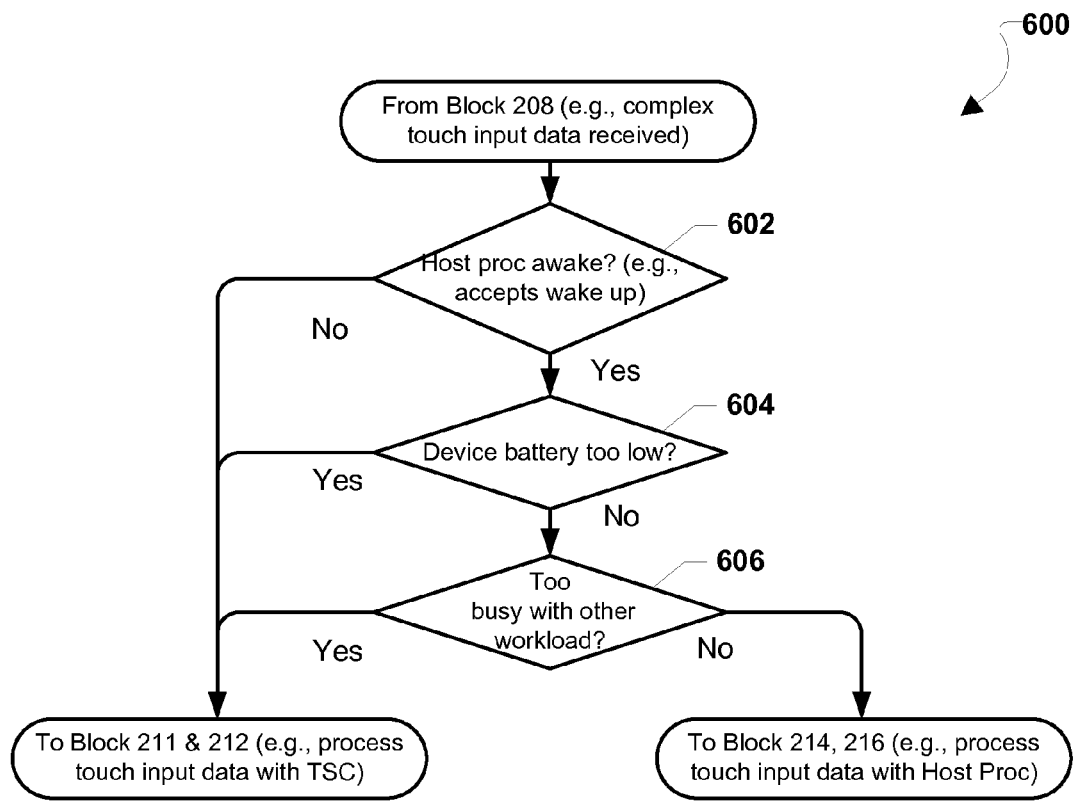
FIG. 6 is a process flow diagram illustrating an aspect method for a touchscreen computing device determining whether a host processor is available to process touch input data.

FIG. 6 illustrates another aspect method 600 for a touchscreen computing device determining whether a host processor is available to process touch input data. When the touchscreen controller determines that the complexity of received touch input data exceeds a tolerance threshold (e.g., the received touch input data is too complex for processing by the touchscreen controller), the touchscreen controller may initiate an interrupt signaling the host processor to process the touch input data. However, under various conditions, the host processor may be unable to immediately process the touch input data. The availability of the host processor may be determined based on evaluations of he host processor's workload, available battery power, a sleep state of the host processor, the complexity of the touch input data, and an assessment of whether the touch input data is noise. When the host processor is unavailable, the touchscreen controller may continue to process the touch input data and, as described above, may configure multiplexors, filters, quantizers, etc. to adjust the reception and transfer of subsequent touch input data such that it is more manageable to the touchscreen controller.

The method 600 may be performed when the touchscreen controller determines received touch input data is too complex for processing by the touchscreen controller with the operations in determination block 208 with reference to FIG. 2. In determination block 602, the touchscreen controller may determine whether the host processor is awake (i.e., not in a sleep state) and ready to process the touch input data. The touchscreen controller may transmit a signal (or initiate an interrupt) to the host processor indicating that touch input data is present and inviting the host processor to process the touch input data. In an aspect, the signal or interrupt may also indicate that the host processor should wake up from a sleep state. If the host processor returns an indication that it is in a sleep state (or alternatively does not respond, which also may indicate that the host processor is not awake) (i.e., determination block 602="No"), the touchscreen controller may continue processing the touch input data with the operations in blocks 211 and 212. Instead of specifying that it is in a sleep state, the host processor may merely reply with a rejection response indicating it will not take over processing of the touch input data. In an aspect, the host processor may transmit a rejection response signal to the touchscreen controller indicating that the host processor is not in a sleep state, but still rejects the invitation to process the touch input data.

If the touchscreen controller determines that the host processor is awake (i.e., determination block 602="Yes"), in determination block 604 the touchscreen controller may determine whether the touchscreen computing device battery has adequate power to enable the host processor to process the touch input data. In an aspect, the touchscreen controller may compare the current battery power of the touchscreen computing device to a threshold value to determine whether there is adequate battery power. In another aspect, as various touch input data may require different amounts of power for the host processor to process, the touchscreen controller may utilize different battery thresholds based on the characteristics of the touch input data. For example, there may be a battery threshold for touch input data determined to be complex based on the number of touch inputs represented (e.g., multi-touch) and another battery threshold for touch input data determined to be complex based on the uniformity of histogram information over time. If the touchscreen controller determines that the device battery power is inadequate for the host processor to process the touch input data (i.e., determination block 604), the touchscreen controller may continue to process the touch input data with the operations in blocks 211 and 212.

If the touchscreen controller determines that the battery power is adequate for the host processor to process the touch input data (i.e., determination block 604="No"), in determination block 606 the touchscreen controller may determine whether the host processor is overburdened and therefore unable to adequately process the touch input data. The host processor's active or scheduled operations may be evaluated to determine whether additional operations related to the touch input data may be adequately performed by the host processor. For example, the current host processor operations may require a certain time period to elapse before processing the touch input data. The touchscreen controller may compare the time before the host processor can begin processing the touch input data to a performance (or time) tolerance threshold to determine whether the host processor may accept the touch input data. In another aspect, the touchscreen controller, host processor, and/or a scheduler component may utilize a priority list to evaluate the importance of active or scheduled operations on the host processor. For example, the priority list may indicate that a currently scheduled routine on the host processor is lower priority than the touch input data, or vice versa. Based on such a priority evaluation, the host processor may reorder scheduled or active operations in order to process the touch input data sooner (e.g., lower priority operations may be buffered or rescheduled). If the host processor determines that it cannot process the touch input data due to a current workload, it may indicate this to the touchscreen controller by sending a rejection response. If the touchscreen controller, host processor, and/or a scheduler component determines that the host processor cannot process the touch input data due to a current workload (i.e., determination block 606="Yes"), the touchscreen controller may continue to process the touch input data with the operations in blocks 211 and 212. However, if the host processor is not overburdened with the current workload (i.e., determination block 606="No"), the register mode may be activated in block 214 and/or the host processor may process the touch input data in block 214.

In an aspect, the operations of the method 600 may be performed by the host processor or any other processing unit associated with the touchscreen controller subsystem and/or the touchscreen computing unit. For example, when receiving touch input data while in register configuration mode, the host processor may determine whether it is still available to process the touch input data based on battery power levels. In another aspect, the method 600 may include any combination of the determinations in determination blocks 602, 604, and 606. For example, the touchscreen controller may determine whether the host processor is available based only on the host processor's workload.

Figure 7:
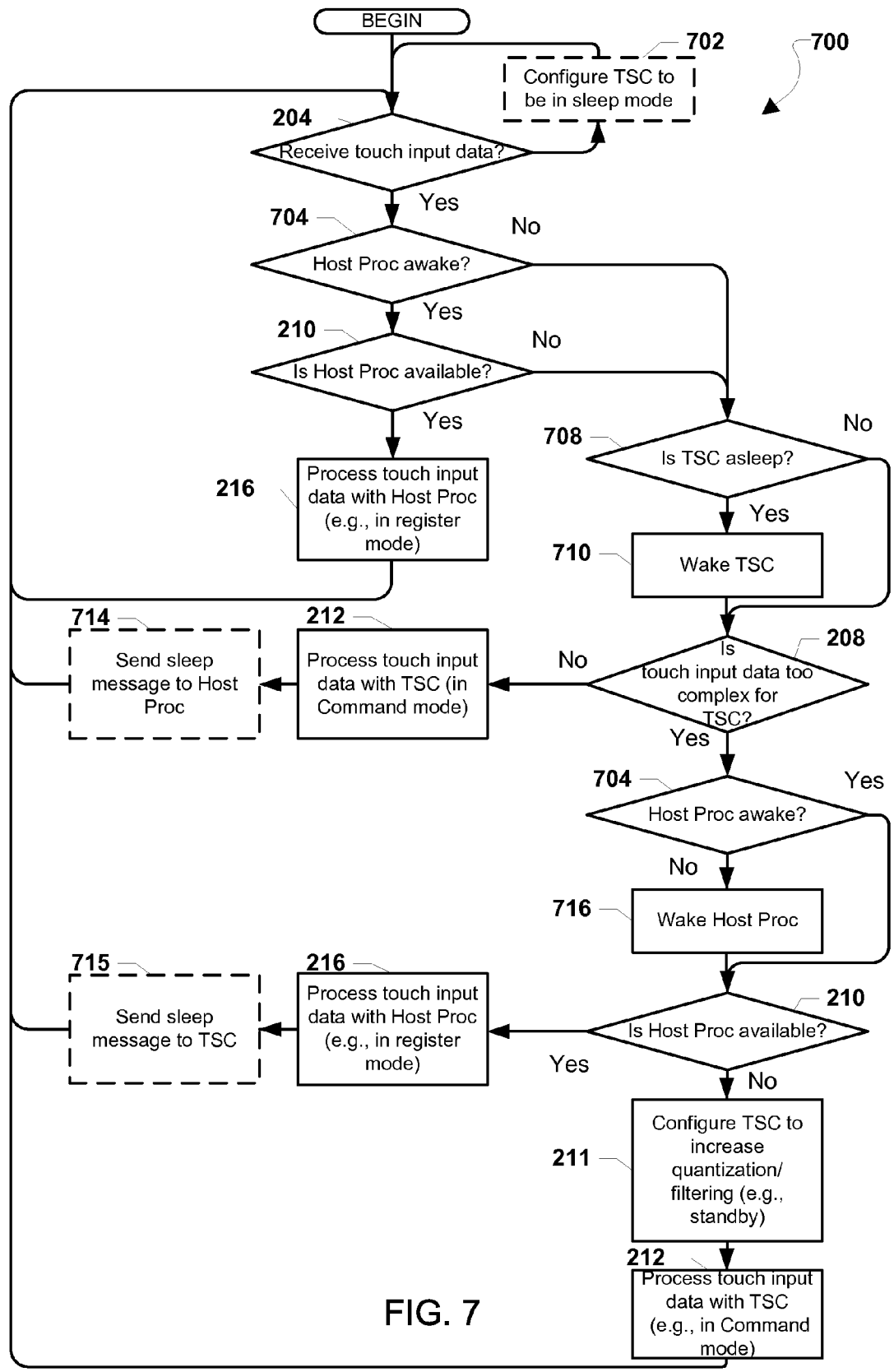
FIG. 7 is a process flow diagram illustrating an aspect method for a touchscreen computing device signaling various processors to process touch input data.

FIG. 7 illustrates an aspect method 700 for a touchscreen computing device utilizing sleep and wake signals while processing touch input data between a touchscreen controller and a host processor. A primary benefit to role negotiation amongst the touchscreen controller and the host processor is efficiently utilizing battery power. When not in use, the touchscreen controller and the host processor may be placed in low power consuming states (i.e., sleep states). Interrupts or other system signals may be utilized to instruct the touchscreen controller and/or the host processor to enter a sleep state (or inversely an awake state), and the transmission of these signals may be based on touch input data complexity determinations as described above. In an aspect, similar to configuration modes (e.g., command mode and register mode), sleep and/or awake states may be represented in the touchscreen computing device by system variables, flags, component settings, or any other technique for indicating system configurations. In the operations of the method 700 described below do not include operations described above for determining whether the touch input data includes noise, such as near-touch noise. In various aspects, the touchscreen controller and/or the host processor may evaluate touch input data for noise when any touch input data is received in determination block 204.

In determination block 204, the touchscreen controller may determine whether touch input data is received. If the touchscreen controller determines that no touch input data is being received (i.e., determination block 204="No"), in optional block 702 the touchscreen controller may enter a sleep state and may configure the touchscreen controller and touchscreen controller subsystem to operate in a scaled-down, low-power capacity. For example, the touchscreen controller subsystem may be configured to utilize fewer resources, a reduced scan rate, and increased skipping (e.g., adjust the parameters of touch sensors within the touchscreen panel). Additionally, if no touch input data is received when the touchscreen computing device is configured to operate in register mode, the touchscreen computing device may be configured to operate in command mode. The touchscreen controller may continue to monitor for received touch input data in determination block 204.

If the touchscreen controller determines that touch input data is received (i.e., determination block 204="Yes"), in determination block 704 the touchscreen controller may determine whether the host processor is in a sleep state. For example, the touchscreen controller may transmit a signal requesting that the host processor transmit a response signal indicating whether it is in a sleep state. Alternatively, the touchscreen controller may independently access a system variable or flag that indicates the state of the host processor. If the touchscreen controller determines that the host processor is awake (i.e., determination block 70="Yes"), in determination block 210 the touchscreen controller may determine whether the host processor is available to accept and process the received touch input data, as described above with reference to FIG. 6. If the touchscreen controller determines that the host processor is available (i.e., determination block 210="Yes"), in block 216 the host processor may begin processing the touch input data in an activated register mode, and the method 700 may continue with the operations in determination block 204.

If the touchscreen controller determines that the host processor is not in an awake state (i.e., determination block 704="No") or is unavailable (i.e., determination block 210="No"), in determination block 708 the touchscreen controller may evaluate whether the touchscreen controller is in a sleep state. In an aspect, while in a sleep state, the touchscreen controller may be configured to utilize minimal resources but may still process interrupts and other signals. If the touchscreen controller is in a sleep state (i.e., determination block 708="Yes"), in block 710 the touchscreen controller may initiate a transition to the awake state. For example, the touchscreen controller may configure system variables to indicate a touchscreen controller awake state or the touchscreen controller may receive a signal instructing the touchscreen controller to wake.

When awake (i.e., determination block 708="No"), or when awakened in block 710, the touchscreen controller may determine whether the touch input data is too complex for processing in the touchscreen controller in determination block 204. If the touchscreen controller determines that the touch input data is not too complex for the touchscreen controller (i.e., determination block 204="No"), in block 212 the touchscreen controller may process the touch input data in an activated command mode. In optional block 714, the touchscreen controller may transmit a signal directing the host processor to enter a sleep state. In an aspect, the host processor may accept or refuse such a sleep signal based on the current host processor workload. The method 700 may continue with the operations in determination block 204.

If the touchscreen controller determines that the touch input data is too complex for the touchscreen controller (i.e., determination block 208="Yes"), in determination block 704 the touchscreen controller may determine whether the host processor is awake, as described above. If the touchscreen controller determines that the host processor is not awake (i.e., determination block 704="No"), in block 716 the touchscreen controller may transmit an interrupt or signal to request that the host processor wake. In determination block 210, the touchscreen controller may determine whether the host processor is available to process the touch input data. In an aspect, the host processor may not become available for processing upon receiving the signaling transmitted in block 716. For example, a wake routine or other processes required to configure the host processor for processing touch input data may not have completed within a certain period. If the touchscreen controller determines that the host processor is available (i.e., determination block 210="Yes"), in block 216 the host processor may begin processing the touch input data in an activated register mode. In optional block 715, the touchscreen controller may be configured to transition to a sleep state when the host processor takes over processing of touch input data. The method 700 may continue with the operations in determination block 204.

If the touchscreen controller determines that the host processor is not available (i.e., determination block 210="No"), in block 211 the touchscreen controller may configure the touchscreen computing device to increase quantization as well as any other techniques to reduce the resolution of touch input data. For example, the touchscreen controller may need to process reduced touch input data to maintain performance. In block 212 the touchscreen controller may proceed to process the touch input data, and the method 700 may continue with the operations in determination block 204.

In other aspects, the method 700 may include operations to check the complexity of received touch input data before processing by the host processor in block 216, as described above with reference to FIG. 2. In an aspect, the touchscreen controller may receive touch input data concurrently with a signal configuring the touchscreen controller to exit a sleep state. For example, an interrupt generator may transmit a wake signal when touch input data is available to be processed by the touchscreen controller.

Figure 8:
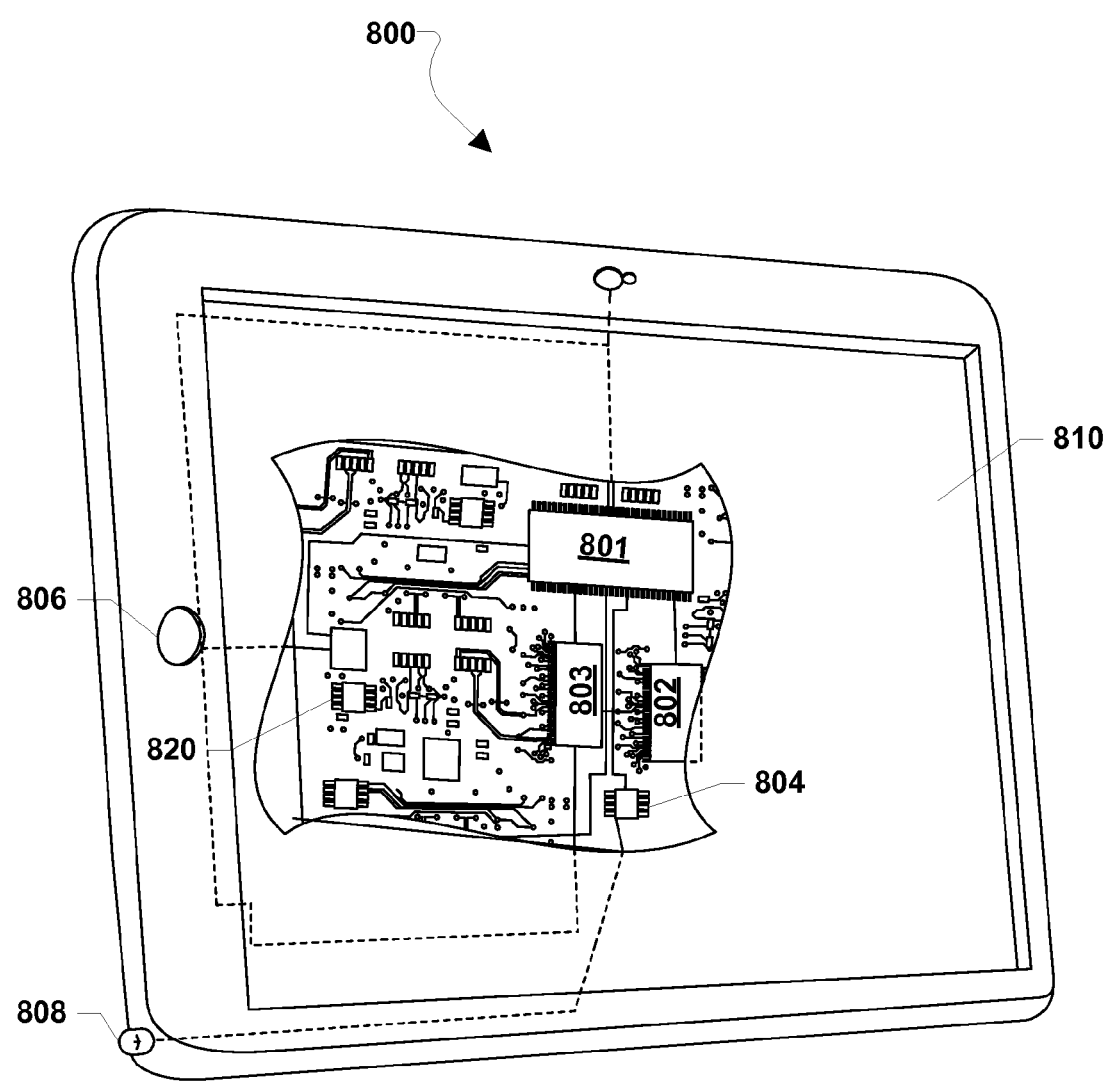
FIG. 8 is a component block diagram of an example wireless tablet device suitable for use with the various aspects.

The various aspects may be implemented in any of a variety of tablet devices, an example of which is illustrated in FIG. 8. For example, the tablet device 800 may include a touchscreen controller 803 and a processor 801 coupled to internal memory 802. The internal memory 802 may be volatile or non-volatile memory, and may also be secure and/or encrypted memory, or unsecure and/or unencrypted memory, or any combination thereof. The touchscreen controller 803 and processor 801 may also be coupled to a touchscreen display 810, such as a resistive-sensing touchscreen, capacitive-sensing touchscreen infrared sensing touchscreen, etc. The tablet device 800 may have one or more short-range radio signal transceivers 804 (e.g., Peanut®, Bluetooth®, Zigbee®, RF radio) and antennas 808 for sending and receiving wireless signals as described herein. The transceivers 804 and antennas 808 may be used with the above-mentioned circuitry to implement the various wireless transmission protocol stacks and interfaces. The tablet device 800 may include a cellular network wireless modem chip 820 that enables communication via a cellular network. The tablet device 800 may also include a physical button 806 for receiving user inputs.

Figure 9:
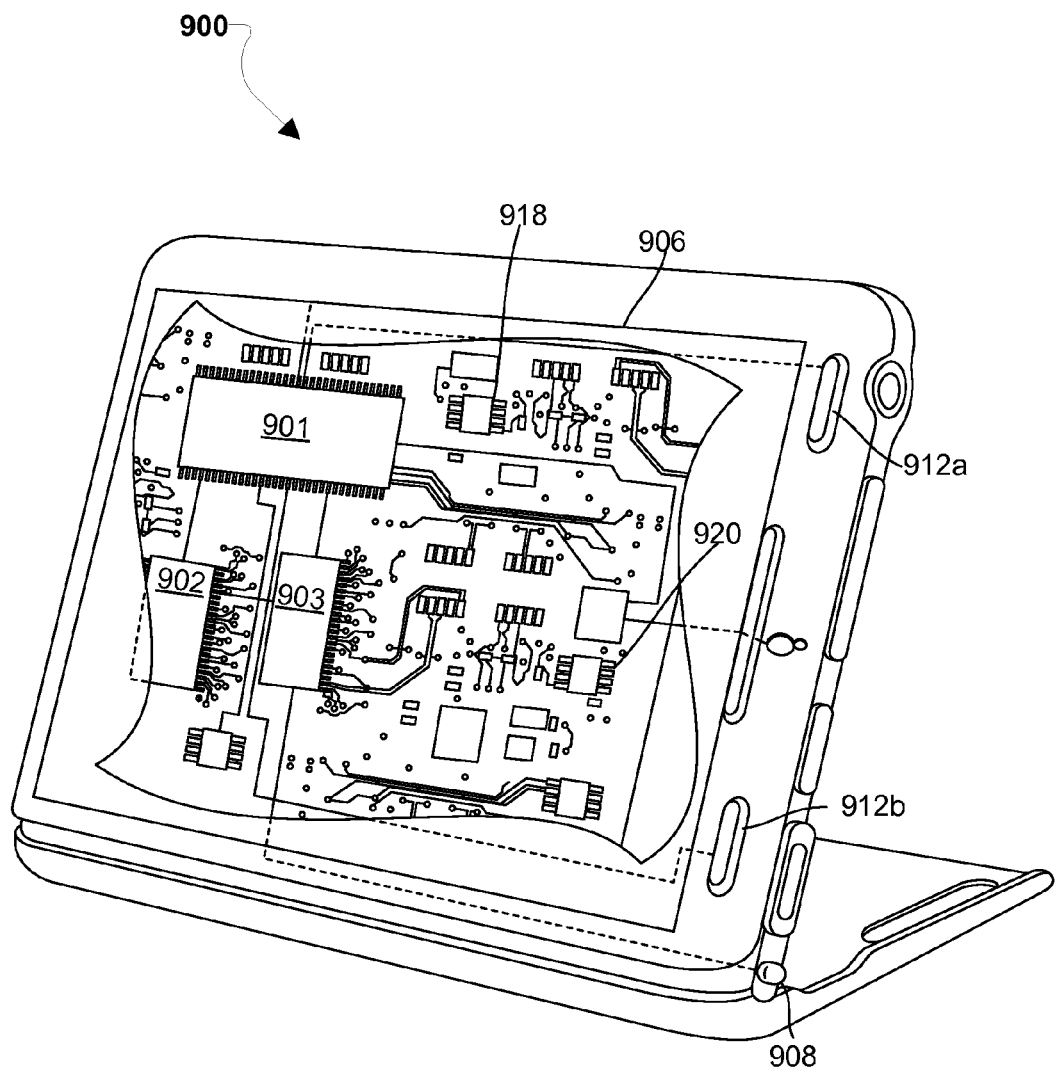
FIG. 9 is a component block diagram of an example wireless mobile computing device suitable for use with the various aspects.

The various aspects may be implemented in any of a variety of mobile devices (e.g., smartphones, feature phones, etc.), an example of which is illustrated in FIG. 9. For example, the mobile computing device 900 may include a touchscreen controller 903 and a processor 901 coupled to internal memory 902. The internal memory 902 may be volatile or non-volatile memory, and may also be secure and/or encrypted memory, or unsecure and/or unencrypted memory, or any combination thereof. The touchscreen controller 903 and processor 901 may also be coupled to a touchscreen display 906, such as a resistive-sensing touchscreen, capacitive-sensing touchscreen infrared sensing touchscreen, etc. The mobile computing device 900 may have one or more short-range radio signal transceivers 918 (e.g., Peanut, Bluetooth®, Zigbee®, RF radio) and antennas 908 for sending and receiving wireless signals as described herein. The transceivers 918 and antennas 908 may be used with the above-mentioned circuitry to implement the various wireless transmission protocol stacks/interfaces. The mobile computing device 900 may include a cellular network wireless modem chip 920 that enables communication via a cellular network. The mobile computing device 900 may also include physical buttons 912a and 912b for receiving user inputs.

The processors 801 and 901 may be any programmable microprocessor, microcomputer or multiple processor chip or chips that can be configured by software instructions (i.e., applications) to perform a variety of functions, including the functions of the various aspects described above. In some devices, multiple processors may be provided, such as one processor dedicated to wireless communication functions and one processor dedicated to running other applications. Typically, software applications may be stored in the internal memory 802 and 902 before they are accessed and loaded into the processors 801, and 901. The processors 801 and 901 may include internal memory sufficient to store the application software instructions. In many devices the internal memory may be a volatile or nonvolatile memory, such as flash memory, or a mixture of both. For the purposes of this description, a general reference to memory refers to memory accessible by the processors 801 and 901 including internal memory or removable memory plugged into the device and memory within the processors 801 and 901.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for processing touch input data from a touchscreen by selectively employing a touchscreen controller or a host processor, comprising:
    receiving touch input data from the touchscreen at a first time;
    assigning a complexity value to the touch input data received from the touchscreen based on previously processed touch input data received from the touchscreen over a plurality of periods of time previous to the first time by:
        comparing the touch input data received from the touchscreen to the previously processed touch input data to determine matching touch input data of the previously processed touch input data;
        determining stored memory access information related to the processing of the matching touch input data; and
        assigning the complexity value to the touch input data received from the touchscreen based on the determined stored memory access information related to the processing of the matching touch input data;
    processing the touch input data with the touchscreen controller when the assigned complexity value is within a predefined tolerance threshold; and
    processing the touch input data with the host processor and placing the touchscreen controller in a low-power state when both the assigned complexity value exceeds the predefined tolerance threshold and the host processor is determined to be available to process the touch input data.

2. The method of claim 1, further comprising:
    returning processing of the touch input data to the touchscreen controller from the host processor when the assigned complexity value of the touch input data falls below the predefined tolerance threshold.

3. The method of claim 1, wherein:
    assigning the complexity value to the received touch input data based on the previously processed touch input data received from the touchscreen over the plurality of periods of time previous to the first time comprises evaluating a histogram of the previously processed touch input data; and
    the touch input data is assigned a high complexity value when the histogram indicates rapid changes in the volume of touch input data over a period of time of the plurality of periods of time and when the histogram represents a uniform distribution of touch input data over a period of time of the plurality of periods of time.

4. The method of claim 1, wherein assigning the complexity value to the received touch input data further comprises analyzing one or more of: a region of the touchscreen represented in the touch input data; characteristics of the touch input data; an idle state of the touchscreen controller; rapidity of touches represented in the touch input data; touch kinetics; and estimations of quality of service over time.

5. The method of claim 1, wherein the predefined tolerance threshold is defined so that processing touch input data with a complexity value below the predefined tolerance threshold by the touchscreen controller will produce acceptable user experiences.

6. The method of claim 1, further comprising:
    determining whether the received touch input data is noise based on analysis of the received touch input data; and
    disregarding the received touch input data when the touch input data is determined to be noise,
    wherein noise includes data that represents at least one of ambient noise, near-touch noise, false-touch noise, and static-touch noise.

7. The method of claim 1, further comprising:
    placing the touchscreen controller in a low-power state when no touch input data is received; and
    placing the touchscreen controller in the low-power state when touch input data is processed by the host processor.

8. The method of claim 1, further comprising:
    determining whether the host processor is available to process the received touch input data in response to determining that the complexity value of the received touch input data exceeds the predefined tolerance threshold.

9. The method of claim 8, wherein determining whether the host processor is available is based on evaluations of at least one of the host processor's workload, available battery power, a sleep state of the host processor, the complexity value of the touch input data, and an assessment of whether the touch input data is noise.

10. The method of claim 8, further comprising using at least one of increased quantization, increased filtering, and a reduced scan rate in response to determining that the host processor is unavailable to process received touch input data.

11. The method of claim 8, wherein determining whether the host processor is available to process the received touch input data comprises:
    transmitting by the touchscreen controller a request to the host processor to take over active processing of the touch input data when the assigned complexity value exceeds the predefined tolerance threshold;
    determining that the host processor is available in response to receiving an acceptance response from the host processor; and
    determining that the host processor is not available in response to receiving a rejection response from the host processor.

12. An electronic device, comprising:
    a touchscreen display;
    a touchscreen controller coupled to the touchscreen display; and
    a host processor coupled to the touchscreen controller and the touchscreen display,
    wherein the touchscreen controller is configured with processor-executable instructions to perform operations comprising:

receiving touch input data from the touchscreen display at a first time;

assigning a complexity value to the touch input data received from the touchscreen based on previously received from the touchscreen based on previously processed touch input data received from the touchscreen display over a plurality of periods of time previous to the first time by:

comparing the touch input data received from the touchscreen to the previously processed touch input data to determine matching touch input data of the previously processed touch input data;

determining stored memory access information related to the processing of the matching touch input data; and assigning the complexity value to the touch input data received from the touchscreen based on the determined stored memory access information related to the processing of the matching touch input data;

processing the touch input data when the assigned complexity value is within a predefined tolerance threshold; and signaling the host processor to process the touch input data and enter a low-power state when both the assigned complexity value exceeds the predefined tolerance threshold and the host processor is determined to be available to process the touch input data, and wherein the host processor is configured with processor-executable instructions to perform operations comprising processing the touch input data when signaled to do so by the touchscreen controller.

13. The electronic device of claim 12, wherein the host processor is configured with processor-executable instructions to perform operations further comprising returning processing of the touch input data to the touchscreen controller when the complexity value falls below the predefined tolerance threshold.

14. The electronic device of claim 12, wherein the touchscreen controller is configured with processor-executable instructions to perform operations such that:

assigning the complexity value to the received touch input data based on the previously processed touch input data received from the touchscreen display over the plurality of periods of time previous to the first time comprises evaluating a histogram of the previously processed touch input data; and the touch input data is assigned a high complexity value when the histogram indicates rapid changes in the volume of touch input data over a period of time of the plurality of periods of time and when the histogram represents a uniform distribution of touch input data over a period of time of the plurality of periods of time.

15. The electronic device of claim 12, wherein the touchscreen controller is configured with processor-executable instructions to perform operations such that assigning the complexity value to the received touch input data further comprises analyzing one or more of: a region of the touchscreen represented in the touch input data; characteristics of the touch input data; an idle state of the touchscreen controller; rapidity of touches represented in the touch input data; touch kinetics; and estimations of quality of service over time.

16. The electronic device of claim 12, wherein the touchscreen controller is configured with processor-executable instructions to perform operations such that the predefined tolerance threshold is defined so that processing touch input data with a complexity value below the predefined tolerance threshold by the touchscreen controller will produce acceptable user experiences.

17. The electronic device of claim 12, wherein the touchscreen controller is configured with processor-executable instructions to perform operations further comprising:

determining whether the received touch input data is noise based on analysis of the received touch input data; and disregarding the received touch input data when the touch input data is determined to be noise, wherein noise includes data that represents at least one of ambient noise, near-touch noise, false-touch noise, and static-touch noise.

18. The electronic device of claim 12, wherein the touchscreen controller is configured with processor-executable instructions to perform operations such that further comprising:

placing the touchscreen controller in a low-power state when no touch input data is received; and placing the touchscreen controller in the low-power state when touch input data is processed by the host processor.

19. The electronic device of claim 12, wherein the touchscreen controller is configured with processor-executable instructions to perform operations further comprising:

determining whether the host processor is available to process the received touch input data in response to determining that the complexity value of the received touch input data exceeds the predefined tolerance threshold.

20. The electronic device of claim 19, wherein the touchscreen controller is configured with processor-executable instructions to perform operations such that determining whether the host processor is available is based on evaluations of at least one of the host processor's workload, available battery power, a sleep state of the host processor, the complexity value of the touch input data, and an assessment of whether the touch input data is noise.

21. The electronic device of claim 19, wherein the touchscreen controller is configured with processor-executable instructions to perform operations further comprising using at least one of increased quantization, increased filtering, and a reduced scan rate in response to determining that the host processor is unavailable to process received touch input data.

22. The electronic device of claim 19, wherein the touchscreen controller is configured with processor-executable instructions to perform operations such that determining whether the host processor is available to process the received touch input data comprises:

transmitting a request to the host processor to take over active processing of the touch input data when the assigned complexity value exceeds the predefined tolerance threshold;

determining that the host processor is available in response to receiving an acceptance response from the host processor; and determining that the host processor is not available in response to receiving a rejection response from the host processor.

23. An electronic device, comprising:

means for receiving touch input data from a touchscreen at a first time;

means for assigning a complexity value to the touch input data received from the touchscreen based on previously processed touch input data received from the touchscreen over a plurality of periods of time previous to the first time by:
  comparing the touch input data received from the touchscreen to the previously processed touch input data to determine matching touch input data of the previously processed touch input data;
  determining stored memory access information related to the processing of the matching touch input data; and
  assigning the complexity value to the touch input data received from the touchscreen based on the determined stored memory access information related to the processing of the matching touch input data;
means for processing the touch input data when the assigned complexity value is within a predefined tolerance threshold;
means for signaling a host processor to process the touch input data and enter a low-power state when both the assigned complexity value exceeds the predefined tolerance threshold and the host processor is determined to be available to process the touch input data, and
means for processing the touch input data when signaled to do so by a touchscreen controller.

24. The electronic device of claim 23, further comprising means for returning processing of the touch input data to the touchscreen controller when complexity value falls below the predefined tolerance threshold.

25. The electronic device of claim 23, wherein:
  means for assigning the complexity value of received touch input data based on the previously processed touch input data received from the touchscreen over the plurality of periods of time previous to the first time comprises means for evaluating a histogram of the previously processed touch input data; and
  means for assigning the complexity value to the touch input data received from the touchscreen comprises means for assigning a high complexity value to the touch input data when the histogram indicates rapid changes in the volume of touch input data over a period of time of the plurality of periods of time and when the histogram represents a uniform distribution of touch input data over a period of time of the plurality of periods of time.

26. The electronic device of claim 23, wherein means for assigning the complexity value to the received touch input data further comprises means for analyzing one or more of: a region of the touchscreen represented in the touch input data; characteristics of the touch input data; an idle state of the touchscreen controller; rapidity of touches represented in the touch input data; touch kinetics; and estimations of quality of service over time.

27. The electronic device of claim 23, wherein the predefined tolerance threshold is defined so that processing touch input data with a complexity value below the predefined tolerance threshold by the touchscreen controller will produce acceptable user experiences.

28. The electronic device of claim 23, further comprising:
  means for determining whether the received touch input data is noise based on analysis of the received touch input data; and
  means for disregarding the received touch input data when the touch input data is determined to be noise, wherein noise includes data that represents at least one of ambient noise, near-touch noise, false-touch noise, and static-touch noise.

29. The electronic device of claim 23, further comprising:
  means for placing the touchscreen controller in a low-power state when no touch input data is received; and
  means for placing the touchscreen controller in the low-power state when touch input data is processed by the host processor.

30. The electronic device of claim 23, further comprising:
  means for determining whether the host processor is available to process the received touch input data in response to determining that the complexity value of the received touch input data exceeds the predefined tolerance threshold.

31. The electronic device of claim 30, wherein means for determining whether the host processor is available comprises means for determining whether the host processor is available based on evaluations of at least one of the host processor's workload, available battery power, a sleep state of the host processor, the complexity value of the touch input data, and an assessment of whether the touch input data is noise.

32. The electronic device of claim 30, further comprising means for using at least one of increased quantization, increased filtering, and a reduced scan rate in response to determining that the host processor is unavailable to process received touch input data.

33. The electronic device of claim 30, wherein means for determining whether the host processor is available to process the received touch input data comprises:
  means for transmitting a request to the host processor to take over active processing of the touch input data when the assigned complexity value exceeds the predefined tolerance threshold;
  means for determining that the host processor is available in response to receiving an acceptance response from the host processor; and
  means for determining that the host processor is not available in response to receiving a rejection response from the host processor.

34. A non-transitory processor-readable storage medium having stored thereon processor executable instructions configured to cause a processor of a touchscreen-equipped electronic device to perform comprising:
  receiving touch input data from the touchscreen at a first time;
  assigning a complexity value to the touch input data received from the touchscreen based on previously processed touch input data received from the touchscreen over a plurality of periods of time previous to the first time by:
    comparing the touch input data received from the touchscreen to the previously processed touch input data to determine matching touch input data of the previously processed touch input data;
    determining stored memory access information related to the processing of the matching touch input data; and
    assigning the complexity value to the touch input data received from the touchscreen based on the determined stored memory access information related to the processing of the matching touch input data;
  processing the touch input data in a touchscreen controller when the assigned complexity value is within a predefined tolerance threshold; and
  processing the touch input data in a host processor and placing the touchscreen controller in a low-power state when both the assigned complexity value exceeds the predefined tolerance threshold and the host processor is determined to be available to process the touch input data.

35. The non-transitory processor-readable storage medium of claim 34, wherein the host processor is configured with processor-executable instructions to perform operations further comprising returning processing of the touch input data to the touchscreen controller when the touch input data complexity value falls below the predefined tolerance threshold.

36. The non-transitory processor-readable storage medium of claim 34, wherein the stored processor-executable instructions are configured to cause a processor of a touchscreen-equipped electronic device to perform operations such that:
assigning the complexity value to the received touch input data based on the previously processed touch input data received from the touchscreen over the plurality of periods of time previous to the first time further comprises evaluating a histogram of the previously processed touch input data; and
the touch input data is assigned a high complexity value when the histogram indicates rapid changes in the volume of touch input data over a period of time of the plurality of periods of time and when the histogram represents a uniform distribution of touch input data over a period of time of the plurality of periods of time.

37. The non-transitory processor-readable storage medium of claim 34, wherein the stored processor-executable instructions are configured to cause a processor of a touchscreen-equipped electronic device to perform operations such that assigning the complexity value to the received touch input data further comprises analyzing one or more of: a region of the touchscreen represented in the touch input data; characteristics of the touch input data; an idle state of the touchscreen controller; rapidity of touches represented in the touch input data; touch kinetics; and estimations of quality of service over time.

38. The non-transitory processor-readable storage medium of claim 34, wherein the stored processor-executable instructions are configured to cause a processor of a touchscreen-equipped electronic device to perform operations such that the predefined tolerance threshold is defined so that processing touch input data with a complexity value below the predefined tolerance threshold by the touchscreen controller will produce acceptable user experiences.

39. The non-transitory processor-readable storage medium of claim 34, wherein the stored processor-executable instructions are configured to cause a processor of a touchscreen-equipped electronic device to perform operations further comprising:
determining whether the received touch input data is noise based on analysis of the received touch input data; and
disregarding the received touch input data when the touch input data is determined to be noise,
wherein noise includes data that represents at least one of ambient noise, near-touch noise, false-touch noise, and static-touch noise.

40. The non-transitory processor-readable storage medium of claim 34, wherein the stored processor-executable instructions are configured to cause a processor of a touchscreen-equipped electronic device to perform operations such that further comprising:
placing the touchscreen controller in a low-power state when no touch input data is received; and
placing the touchscreen controller in the low-power state when touch input data is processed by the host processor.

41. The non-transitory processor-readable storage medium of claim 34, wherein the stored processor-executable instructions are configured to cause a processor of a touchscreen-equipped electronic device to perform operations further comprising:
determining whether the host processor is available to process the received touch input data in response to determining that the complexity value of the received touch input data exceeds the predefined tolerance threshold.

42. The non-transitory processor-readable storage medium of claim 41, wherein the stored processor-executable instructions are configured to cause a processor of a touchscreen-equipped electronic device to perform operations such that determining whether the host processor is available is based on evaluations of at least one of the host processor's workload, available battery power, a sleep state of the host processor, the complexity value of the touch input data, and an assessment of whether the touch input data is noise.

43. The non-transitory processor-readable storage medium of claim 41, wherein the stored processor-executable instructions are configured to cause a processor of a touchscreen-equipped electronic device to perform operations further comprising using at least one of increased quantization, increased filtering, and a reduced scan rate in response to determining that the host processor is unavailable to process received touch input data.

44. The non-transitory processor-readable storage medium of claim 41, wherein the stored processor-executable instructions are configured to cause a processor of a touchscreen-equipped electronic device to perform operations such that determining whether the host processor is available to process the received touch input data comprises:
transmitting a request to the host processor to take over active processing of the touch input data when the assigned complexity value exceeds the predefined tolerance threshold;
determining that the host processor is available in response to receiving an acceptance response from the host processor; and
determining that the host processor is not available in response to receiving a rejection response from the host processor.

* * * * *